(12) United States Patent
Cheong et al.

(10) Patent No.: US 7,995,657 B2
(45) Date of Patent: Aug. 9, 2011

(54) INTELLIGENT WATER RING SCAN APPARATUS AND METHOD BASED ON QUALITY FACTOR, AND VIDEO ENCODING/DECODING APPARATUS AND METHOD USING THE SAME

(75) Inventors: Won-Sik Cheong, Daejon (KR); Kyuheon Kim, Daejon (KR); Yoon-Jin Lee, Jeollabuk-Do (KR); Jinwoong Kim, Daejon (KR); Chieteuk Ahn, Daejon (KR); Gwang-Hoon Park, Gyeonggi-Do (KR)

(73) Assignees: Electronics and Telecommunications Research Institute (KR); Kohwang Foundation (KR)

( * ) Notice: Subject to any disclaimer, the term of this patent is extended or adjusted under 35 U.S.C. 154(b) by 1295 days.

(21) Appl. No.: 10/496,927

(22) PCT Filed: Nov. 26, 2002

(86) PCT No.: PCT/KR02/02215
§ 371 (c)(1),
(2), (4) Date: May 25, 2004

(87) PCT Pub. No.: WO03/047263
PCT Pub. Date: Jun. 5, 2003

(65) Prior Publication Data
US 2005/0013357 A1    Jan. 20, 2005

(30) Foreign Application Priority Data

Nov. 26, 2001  (KR) .................. 10-2001-0073987

(51) Int. Cl.
*H04N 7/12* (2006.01)
*H04N 11/02* (2006.01)
*H04N 11/04* (2006.01)
*G06K 9/36* (2006.01)
*G06K 9/46* (2006.01)

(52) U.S. Cl. ......... 375/240.25; 375/240.26; 375/240.27; 382/239; 382/240; 382/248

(58) Field of Classification Search ............. 375/240.25–240.27; 382/239, 382/240, 248
See application file for complete search history.

(56) References Cited

U.S. PATENT DOCUMENTS 5,402,146 A    3/1995    Rodriguez et al.
(Continued)

FOREIGN PATENT DOCUMENTS
JP    02-056187    2/1990
(Continued)

OTHER PUBLICATIONS

ISCAS 2000—IEEE International Symposium on Circuits and Systems, May 29-31, 2000, Geneva, Switzerland, pp. I-299-I-301.
(Continued)

*Primary Examiner* — Marsha D Banks Harold
*Assistant Examiner* — Chikaodili E Anyikire
(74) *Attorney, Agent, or Firm* — Blakely, Sokoloff, Taylor & Zafman

(57) ABSTRACT

Provided are intelligent water ring scan apparatus and method thereof, image encoding/decoding apparatus using the water ring scanning and method thereof, and a computer-readable recording medium for recording a program that implements the methods. The apparatus or method of this research selectively improves the image quality of a particular image part that needs to be encoded with priority by transmitting the image data of the particular image part suitably for a human visual system so as to provide a visually improved image. The encoding apparatus of this research differentiates the amount of image data depending on the significance of a certain image part to process the image in various qualities suitably for the human visual system. The methods of this research can be applied to an image encoding/decoding process.

28 Claims, 36 Drawing Sheets

U.S. PATENT DOCUMENTS

| | | | |
|---|---|---|---|
| 5,920,359 A * | 7/1999 | Curley et al. | 348/699 |
| 6,011,872 A * | 1/2000 | Qian et al. | 382/243 |
| 6,192,081 B1 | 2/2001 | Chiang et al. | |
| 6,256,423 B1 | 7/2001 | Krishnamurthy et al. | |
| 6,728,317 B1 * | 4/2004 | Demos | 375/240.21 |
| 6,990,246 B1 * | 1/2006 | Ferguson | 382/240 |
| 6,996,275 B2 * | 2/2006 | Edanami | 382/218 |

FOREIGN PATENT DOCUMENTS

| | | |
|---|---|---|
| JP | 02-119464 | 5/1990 |
| JP | 05-252499 | 9/1993 |
| JP | 05252449 A | 9/1993 |
| JP | 09182073 A | 7/1997 |
| JP | 2000-050261 | 2/2000 |
| KR | 1020020005365 A | 1/2002 |
| KR | 2002-0087810 | 11/2002 |

OTHER PUBLICATIONS

"FGS Coding Scheme with Arbitrary Water Ring Scan Order", W. Cheong, et al., International Organisation for Standardisation ISO/IEC JTC1/SC29/WG11, Jul. 2001.

"Content-based selectrive enhancement for streaming video" Proceedings 2001 International Conference onImage Processing, 2001 IEEE, vol. 1 of 3 conf. 8, Oct. 7, 2001.

"Representing Multiple Regions of Interest with Wavelets", Duchowski, vol. 3309, Jan. 28, 1998, pp. 975-986.

* cited by examiner

▨ DECODED MACRO BLOCK (OR BLOCK)
☐ MACRO BLOCK (OR BLOCK) NOT DECODED

FIG. 11

| WATER RING | QUALITY FACTOR (QF) |
|---|---|
| WR (0) | 4 |
| WR (1) | 3 |
| WR (2) | 2 |
| WR (3) | 2 |
| WR (4) | 1 |
| WR (5) | 1 |
| WR (6) | 0 |
| WR (7) | 0 |
| ...... | ...... |

EX : MAX QF = 4

FIG. 15A

| | |
|---|---|
| QF MODEL | QF_MAX*EXP(-(i*i) / (QF_FACTOR*QF_FACTOR)) |
| QF VALUE | ROUND(QF_MODEL) |
| QF_MAX | 4 |
| QF_FACTOR | 5 |

| WR (i) | QF MODEL | QF |
|---|---|---|
| 0 | 4 | 0 |
| 1 | 3.843157757 | 0 |
| 2 | 3.408575156 | 0 |
| 3 | 2.790705304 | 0 |
| 4 | 2.109169696 | 0 |
| 5 | 1.471517765 | 0 |
| 6 | 0.947711035 | 0 |
| 7 | 0.563433684 | 0 |
| 8 | 0.309218962 | 0 |
| 9 | 0.15665558 | 0 |
| 10 | 0.073262556 | 0 |

CIRCULAR QUADRATE                    ELLIPTIC RECTANGLE

INTELLIGENT WATER RING SCAN APPARATUS AND METHOD BASED ON QUALITY FACTOR, AND VIDEO ENCODING/DECODING APPARATUS AND METHOD USING THE SAME

The present patent application is a non-provisional application of International Application No. PCT/KR02/02215, filed Nov. 26, 2002.

TECHNICAL FIELD

The present invention relates to an intelligent water ring scan apparatus and method; and, more particularly, to a water ring scan apparatus and method that can improve image quality even in a poor data transmission environment by using a water ring scanning technique and exchanging image sequences properly for a human visual system (HVS) at each water ring, and a computer-readable recording medium for recording a program that implements the method. The water ring scanning technique restores an image sequence by scanning it at an certain, arbitrary spot most preferentially, scanning another neighboring image data on the outskirt of the image sequence, and repeating this process.

BACKGROUND ART

There is an explosive demand for a scalable encoding method as a method for encoding an image including still images and moving pictures. Particularly, people want to obtain, manage and modify image data using mobile telecommunication services that makes anyone possible to communicate with whomever, wherever and whenever with use of image data, and information household appliances that are connected with various kinds of computers such as laptops, palm top computers, PDAs and so forth, which have been brought with the introduction of a wireless internet. Therefore, diverse forms of image data household appliances such as IMT-2000 video phones and HDTV will be shown in the market and the decoding ability or information transmission environment of those image data household appliances will be different from each other, for the properties and application environment are different according to the kind of a terminal.

What needs to be considered here is how to transmit a moving picture suitably to the reception environment of each terminal. For instance, if encoding is carried out agreeably to a low quality decoder, a user with a high quality decoder will receive the low quality image with his expensive decoder, which no one ever wants. That is, a user with a high quality decoder may well have to obtain high quality image, and even a user with a low quality decoder will have to receive quite a level of an image. For example, when the terminal on the receiving end is of high computing power and the delivery layers, e.g., wireless, ATM, LAN, etc., are in a good condition, it can receive and display a high quality moving picture. However, when its computing power and delivery lines are not in a good condition, it cannot receive the high quality image.

To address this problem, Moving Pictures Expert Group-4 (MPEG-4) designs to provide an image in various levels of image quality based on the environment and performance of a terminal on the receiving part.

A scalable encoding is a method where the encoding part makes and transmits scalable bit streams so that the receiving end could receive the image in various image qualities from the low quality to the high quality. That is, if bit streams are scalable, a low-performance receiving terminal will receive and display image bit streams of basic quality, which have been encoded in the base layer, while a high-performance receiving terminal receives and displays high quality image bit streams, which have been encoded in the enhancement layer.

The scalable encoding method largely consists of a base layer and an enhancement layer. The base layer of the encoding part transmits basic moving picture data and its enhancement layer transmits data for providing an image of an advanced quality in addition to the moving picture data of a basic quality so that the receiving end could put the data from the base layer and the data from the enhancement layer together and decode into a high quality image.

Therefore, the receiving end performs decoding on the image data from the two layers transmitted in accordance with the computing power of the receiving terminal and the delivery layer condition. If a decoder does not have sufficient decoding ability for all the data transmitted through the delivery layers, it decodes the data from the base layer only, which is the minimum image quality compensation layer, and the data from the enhancement layer remains undecoded and dismissed. In the mean time, a high-quality receiving terminal can afford all the data from all layers and achieves high quality images. Accordingly, it is possible to receive images that can satisfy both users with a high quality decoder and those with a low quality decoder by using the scalable encoding method.

A conventional scalable encoding method is designed suitable for a case where the delivery layers are in a relatively stable and good condition. That is, an image frame can be restored completely only when the receiving end receives all bit streams transmitted from the enhancement layers. If the delivery layer condition is changed (the bit stream bandwidth that the delivery layers can accommodate is changed: the delivery layers like the Internet changes its bandwidth to be assigned to users by external factors, such as the number of Internet users) and the entire bit streams from the enhancement layer are not received, the corresponding image frame cannot be restored normally. In this case, the receiving end should request the transmitting part for retransmission, or give up performing image restoration until all the bit streams are received, or perform transmission error concealment by using the preceding frame image.

It frequently happens in the wired/wireless Internet that image bit streams are not transmitted as fast as to catch up with the real-time due to the unstable delivery layer condition. In short, to restore the transmitted image in real-time even when the bandwidth is changed due to the unstable delivery layer condition as it happens in the wired/wireless Internet, the receiving end must be able to restore the image in real-time only with part of the image bit streams which have been received till then, although it hasn't received all the bit streams. One example for this method is a fine granular scalability (FGS) method suggested by MPEG-4 and established as a draft international standard.

The FGS encoding method makes it possible to restore a transmitted image with some bit streams that have been received till then, when the receiving end does not receive all the bit streams encoded in and transmitted from the base layer encoder and the enhancement layer encoder, for instance, when the delivery layer is unstable, and is changed suddenly, just as the wired/wireless Internet is and the bandwidth to be assigned to the users is changed during the scalable encoding. It is designed to supplement the shortcoming of the conventional scalable encoding method, which is embodied in consideration of a stable delivery layer.

In order to restore an image efficiently with part of the image bit streams at the receiving end, image bit streams are transmitted on a bit-plane basis, when the transmitting end forms an image with an improved quality at the base layer based on the transmitted image and transmits it. That is, the FGC method is similar to the conventional scalable encoding method in that it improves the quality of the transmitted image by sending out image difference between the original image and the image transmitted from the base layer, when bit streams needed for the enhancement layer are transmitted from the transmitting part to the receiving end. However, with the method of the present invention, although the bandwidth of the delivery layers is changed suddenly and not all the bits needed for image restoration have been received, an image can be restored by using the bit streams received till then. According to this method, image data to be transmitted are divided into bit-planes. Subsequently, the most significant bit (MSB) is transmitted on a top priority, and then the next significant bit is transmitted and the process is repeated on and on.

FIG. 1A is a block diagram illustrating a structure of a conventional FGS encoder, and FIG. 1B is a block diagram illustrating a structure of a conventional FGS decoder. As depicted in the drawing, the base layer of the FGS encoder defined in the MPEG-4 international standards adopts the MPEG-4 image encoding method.

The FGS encoder includes discrete cosine transform (DCT) units, a bit-plane shifting unit, a maximum value calculating unit, a bit-plane-based variable length encoding (VLC) unit, a quantization (Q) unit, a variable length encoding (VLC) unit, a motion compensation (MC) unit, an inverse quantization ($Q^{-1}$), an inverse discrete cosine transform (IDCT), a motion estimation (ME), a frame memory, and a clipping unit.

In the image encoding method, image data are impressed in the spatial and temporal directions through the DCT, quantization unit, ME unit, MC unit, inverse quantization unit, and IDCT unit. Then, entropy encoding is carried out based on the preponderance of sign generation probability by performing VLC, and thus base layer bit stream is transmitted.

As shown in the drawing, the FGS encoding of the enhancement layer is performed through the procedures of obtaining residues between the original image and the image restored in the base layer, performing DCT, performing bit-plane shift, finding maximum value, and performing bit-plane VLC.

In the procedure of obtaining the residue, the residue is obtained by calculating the difference between the original image and the image that is restored after encoded in the base layer. The latter image is a restored image that has passed through the inverse quantization unit ($Q^{-1}$), the IDCT unit, and the clipping unit in the drawing.

The DCT unit transforms the image-based residue obtained in the above procedure into the DCT domain by using a block(8×8)-based DCT.

Here, if you want a block with optionally higher quality, the corresponding value should be transmitted prior to anything else, and for this, bit-plane shift may be performed optionally. This is defined as a selective enhancement, and it is performed in the bit-plane shifting unit.

The maximum value calculating unit calculates the maximum value among the absolute values of all the other values that have gone through DCT. The obtained maximum value is used to calculate the number of maximum bit-planes for transmitting a corresponding image frame.

The bit-plane VLC unit forms 64 DCT coefficients (bit of the bit-planes corresponding to a DCT coefficient: 0 or 1) obtained on a block basis into a matrix in a zigzag scan order. Each matrix is run-length encoded according to the VLC table.

As illustrated in FIG. 1B, a structure of a conventional FGS decoder defined in the MPEG-4 Draft International Standards is divided into the base layer and the enhancement layer. The decoding of the bit streams transmitted from the delivery layers is performed in reverse to the encoding process of the encoder depicted in FIG. 1A.

In the base layer, the MPEG-4 image decoding method is used as it is without any intactness. The FGS encoder includes a bit-plane variable length decoding (VLD) unit, a bit-plane shifting unit, inverse discrete cosine transform (IDCT) units, clipping units, a VLD unit, an inverse quantization ($Q^{-1}$), a motion compensation (MC) unit, and a frame memory. The image transmitted from the base layer is restored by after the bit stream is inputted into the base layer, performing VLD, performing inverse quantization, carrying out IDCT on the corresponding values, adding them to MC values, and clipping the corresponding values between the values from 0 to 255.

In the enhancement layer adopting the FGS encoding method, the decoding of the bit streams transmitted to the enhancement layer is performed in reverse to the encoding process of the encoder. First, bit-plane VLD is performed on the inputted enhancement bit stream, and if the location information on a block having optionally higher image quality optionally is transmitted, bit-plane shift may be performed optionally.

Subsequently, the IDCT unit performs block(8×8)-based IDCT on the values obtained by performing the bit-plane VLD and performing the optional shifting to restore the image transmitted from the enhancement layer. Then, it clips the values summed to the image encoded in the base layer into the values between 0 and 255 to finally restore the image with improved quality.

Here, in order to restore an image with as many bit streams as received till then, only a method that can maximize the encoding efficiency of the base layer, and no other methods that enhances encoding efficiency of the enhancement layer may be used.

FIG. 2A is an exemplary view illustrating a conventional raster scan order in an image and moving picture encoding method using DCT, and FIG. 2B is an exemplary view applying the conventional raster scan order to the scalable encoding method.

In an image encoding methods using DCT that is usually used in Joint Photographic Experts Group (JPEG), H.263, MPEG, image data is encoded and transmitted on a macro block basis or on an 8×8 block basis. Here, the encoding and decoding of all the image frames or the video object plane (VOP) begin from a macro block, or block, at the top-left line of the image and proceed to the one at the bottom-left part successively. In this invention, this is referred to as Raster Scan Order, which is illustrated in FIG. 2A.

The raster scan order is a scan order that should be used necessarily to apply a method for enhancing encoding efficiency between the base layer and the enhancement layer, or between the enhancement layers to the conventional image or moving picture processing method.

When applying the raster scan order to the scalable encoding method that makes it possible to restore an image with some bit streams received till then only, part of macro blocks or blocks on the upper part are decoded and the restored image is displayed on the screen of the receiving end as illustrated in FIG. 2B. The black blocks are decoded blocks, while white blocks are ones that are not decoded yet.

That is, in a process of restoring an improved image at a receiving end based on the bit streams transmitted to the base layer and some bit streams transmitted to the enhancement layer and decoded, as depicted in FIG. 2B, if only upper part of the image data are received and decoded in the enhancement layer, the restored image gets to have improved image only on the part where decoding is performed in the enhancement layer. However, this method has a shortcoming that the improved part of the restored image may be somewhere viewers do not pay attention, such as background, or something else except the face of an actor, and thus this process of receiving and restoring bit streams of the enhancement layer becomes useless.

DISCLOSURE OF INVENTION

To restore an image with some bit streams only, the encoding efficiency in the base layer should be maximized. Therefore, even if the image data of the enhancement layer is transmitted in an arbitrary scan order instead of the raster scan order, the bit streams transmitted from a decoder can be restored without any error.

It is, therefore, an object of the present invention to provide an apparatus and method that can improve the image quality at a major image frame part even in a poor image data transmission environment and provide an image suitable for a human visual system by using a water ring scanning technique, which repeatedly performs the process of encoding a certain part of an image frame on a top priority and then encoding the neighboring image data on the outskirt of the precedingly encoded image to encode and transmit the image data of each water ring based on the priority.

It is another object of the present invention to provide a scanning apparatus and method that can maximize the quality of a received image considering the human visual system without using raster scan order, so as to restore an image only with some bit streams received from the enhancement layer at the receiving end of an image encoding apparatus even in a poor data transmission environment.

Other objects and aspects of the invention will become apparent from the description and claims of the present invention with reference to the accompanying drawings.

In accordance with an aspect of the present invention, the image encoding apparatus differentiates the amount of image data to be encoded depending on the significance priority so as to process an image suitably for the human visual system in various image quality levels.

In accordance with another aspect of the present invention, the image encoding method differentiates the amount of image data to be encoded depending on the significance priority so as to process an image suitably for the human visual system in various image quality levels.

In accordance with another aspect of the present invention, the computer-readable recording medium for recording a program that implements the image encoding method differentiates the amount of image data to be encoded depending on the significance priority so as to process an image suitably for the human visual system in various image quality levels.

In accordance with another aspect of the present invention, the image decoding apparatus differentiates the amount of image data to be decoded depending on the significance priority so as to process an image suitably for the human visual system in various image quality levels.

In accordance with another aspect of the present invention, the image decoding method differentiates the amount of image data to be decoded depending on the significance priority so as to process an image suitably for the human visual system in various image quality levels.

In accordance with another aspect of the present invention, the computer-readable recording medium for recording a program that implements the image decoding method differentiates the amount of image data to be decoded depending on the significance priority so as to process an image suitably for the human visual system in various image quality levels.

In accordance with another aspect of the present invention, the water ring scan apparatus scans and processes image data that are encoded/decoded in a predetermined order to process the image data easily in the image encoding/decoding process.

In accordance with another aspect of the present invention, the water ring scan method performs scanning and processes image data that are encoded/decoded in a predetermined order to process the image data easily in the image encoding/decoding process.

In accordance with another aspect of the present invention, the computer-readable recording medium records a program that implements the water ring scan method for scanning and processing image data that are encoded/decoded in a predetermined order to process the image data easily in the image encoding/decoding process.

Other objects and aspects of the invention will become apparent from the description and claims of the present invention with reference to the accompanying drawings. In addition, when it is determined that more detailed description on the related prior art may make the point of the present invention blurry, the detailed description will be omitted. Hereinfrom, preferred embodiments of the present invention will be described referring to the accompanying drawings.

The method of the present invention improves an image suitably for the human visual system by transmitting an image in the water ring origin point, the image in which needs to be encoded on a top priority, in high quality, and degenerating the other image parts on the outskirt of the entire image gracefully in the water ring scan process. For example, in case where the central part of an image is a water ring origin point, because the most significant object usually lies at the center of a screen when a photograph is taken, the image on the central part should not only be transmitted/received on a top priority, but also show the highest quality. Since the user becomes less interested in the image, as it goes to the outskirt of the image, the priority for transmission/reception and the image quality are decreased gracefully. This way, the quality of the image in the interesting part is guaranteed at the reception end, while the same transmission bit rate of the conventional video encoding method is maintained.

In accordance with another aspect of the present invention, encoding is performed with priority at an arbitrary part of an image frame to be transmitted. Here, the amount of data transmission is differentiated based on the significance of the parts of the image so as to perform an intelligent method. In the intelligent method, the image quality at a particular part is improved suitably for the human visual system. Then, the receiving end receives the image data and performs decoding from the part transmitted on a top priority. The image is restored with the bit streams that are transmitted before data transmission stops due to poor transmission environment. The image data in the most significant part are transmitted/received with priority to improve the data in the corresponding location based on the significance.

In the method of the present invention, an arbitrary part of an image frame that needs to be encoded and transmitted with priority is determined. Then, encoding is performed from the part into the neighboring parts gracefully. That is, after encoding is first performed at a certain part, the process of encoding the next image data neighboring the preceding image is repeated. This method makes an image frame improved suitably for the human visual system by transmitting/receiving more data for the most significant image part and less data for the image parts on the outskirts.

BRIEF DESCRIPTION OF DRAWINGS

The above and other objects and features of the present invention will become apparent from the following description of the preferred embodiments given in conjunction with the accompanying drawings, in which:

FIG. 11 is a water ring(i)-QF table in accordance with an embodiment of the present invention;

FIGS. 15A and 15B are table and graph illustrating the result of applying parameters to a QF determining model in accordance with an embodiment of the present invention;

BEST MODE FOR CARRYING OUT THE INVENTION

Other objects and aspects of the invention will become apparent from the following description of the embodiments with reference to the accompanying drawings, which is set forth hereinafter.

The concept of this method is like water rings occurring on the surface of the water, when a stone is thrown into a lake. The basic concept of this method is illustrated in FIG. 3.

Figure 1A:
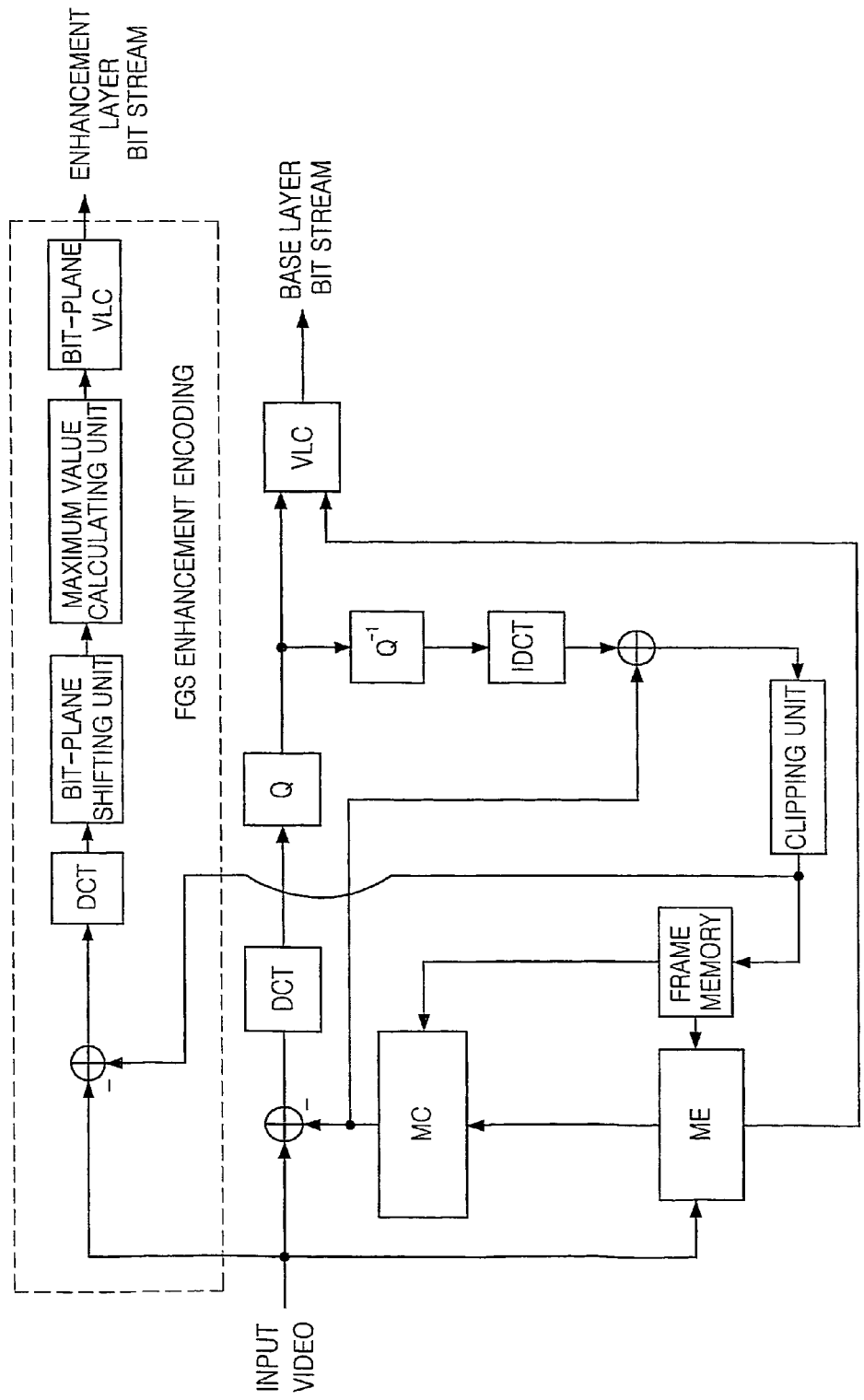
FIG. 1A is a block diagram illustrating a structure of a conventional fine granular scalability (FGS) encoder.
Figure 1B:
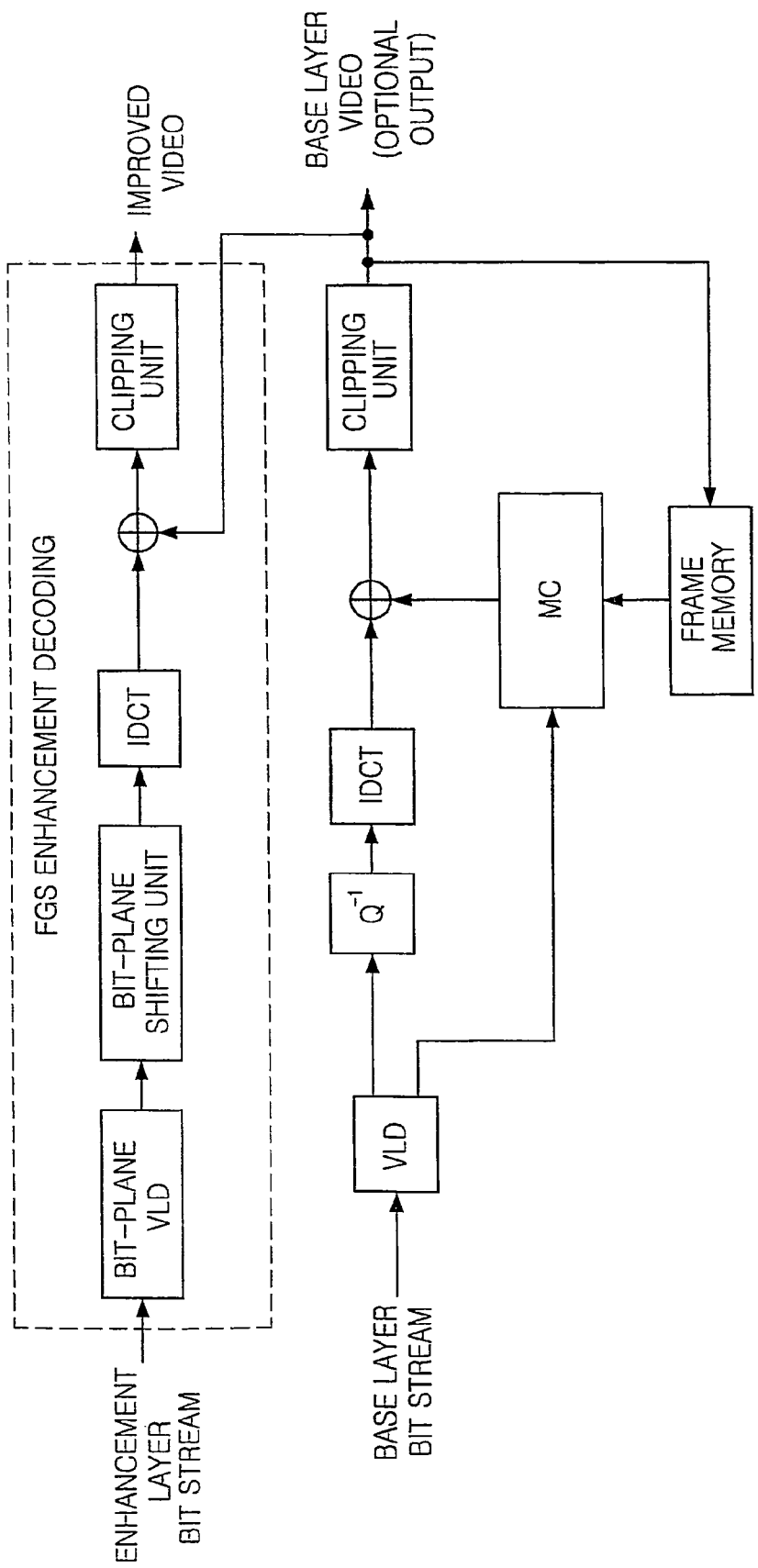
FIG. 1B is a block diagram illustrating a structure of a conventional FGS decoder.
Figure 2A:
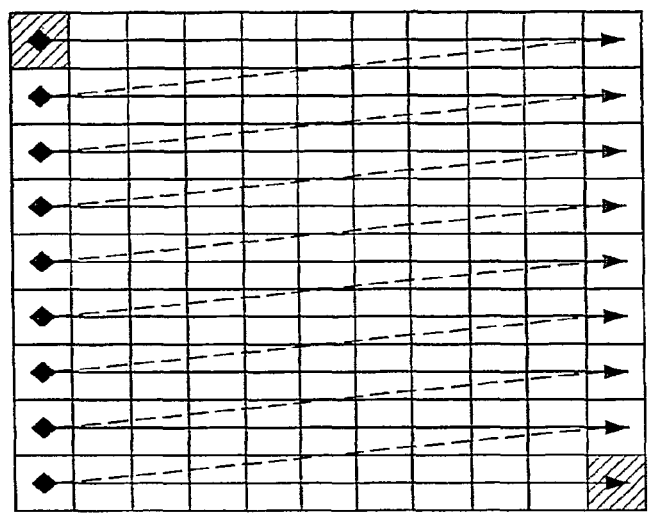
FIG. 2A is an exemplary view illustrating a conventional raster scan order in an image and moving picture encoding method using DCT.
Figure 2B:
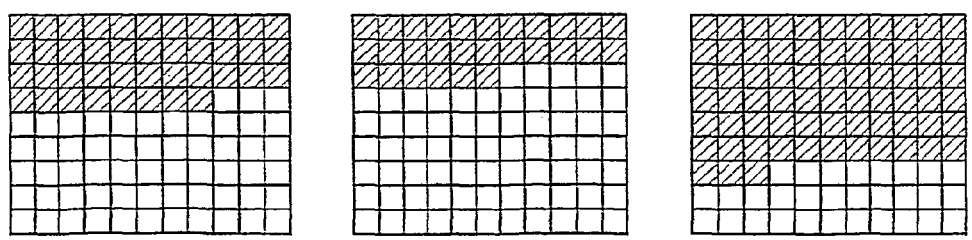
FIG. 2B is an exemplary view of a conventional raster scan order applied to the scalable encoding method.
Figure 3:
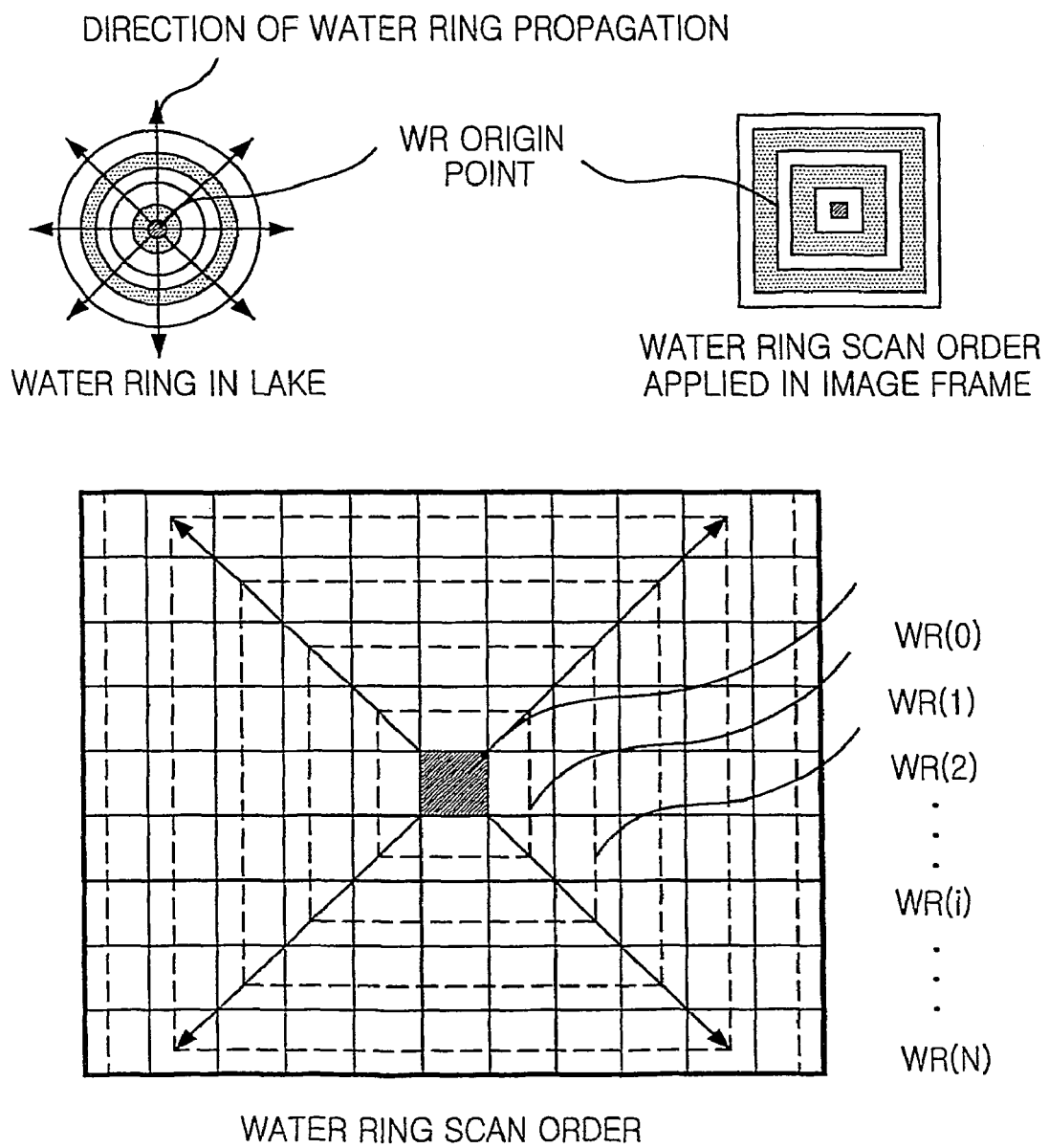
FIG. 3 is a diagram describing the principle of a water ring scan order.

FIG. 3 is a diagram describing the principle of a water ring scan order. The blocks in the drawing denote pixels, blocks, or macro blocks in a video data processing. When the water ring scan order is applied to the encoding of moving pictures, the image data are encoded from a water ring origin point. The water ring origin point is like a spot on the surface of a lake, into which a stone is thrown. The water rings are generated from the origin point and spread towards the outskirt of the lake. In short, water ring scan is a method that processes data from the water ring origin point and then processes the data surrounding the preceding quadrate water ring continuously.

As illustrated in FIG. 3, after the data in the water ring origin point (water ring (0)) are processed, the data in the neighboring water ring (1) are processed, and then the data of a water ring (2) on the outskirt of the water ring (1) and the data of a water ring (3) surrounding the water ring (2) are processed successively, just as water rings spread away on the surface of a lake. The scan order of this process that generates water rings and processes the image data in the corresponding water ring location will be referred to as a Water Ring Scan Order, herefrom.

The water ring scan order in an image/moving picture encoding can be applied on a pixel, block, or macro block basis. In case where the water ring scan order is applied on a pixel basis, a pixel-based image encoding method, such as wavelet conversion, is used. In case where a method using DCT is used, an image/moving picture can be processed by performing the water ring scanning on a block, or macro block basis.

Figure 4:
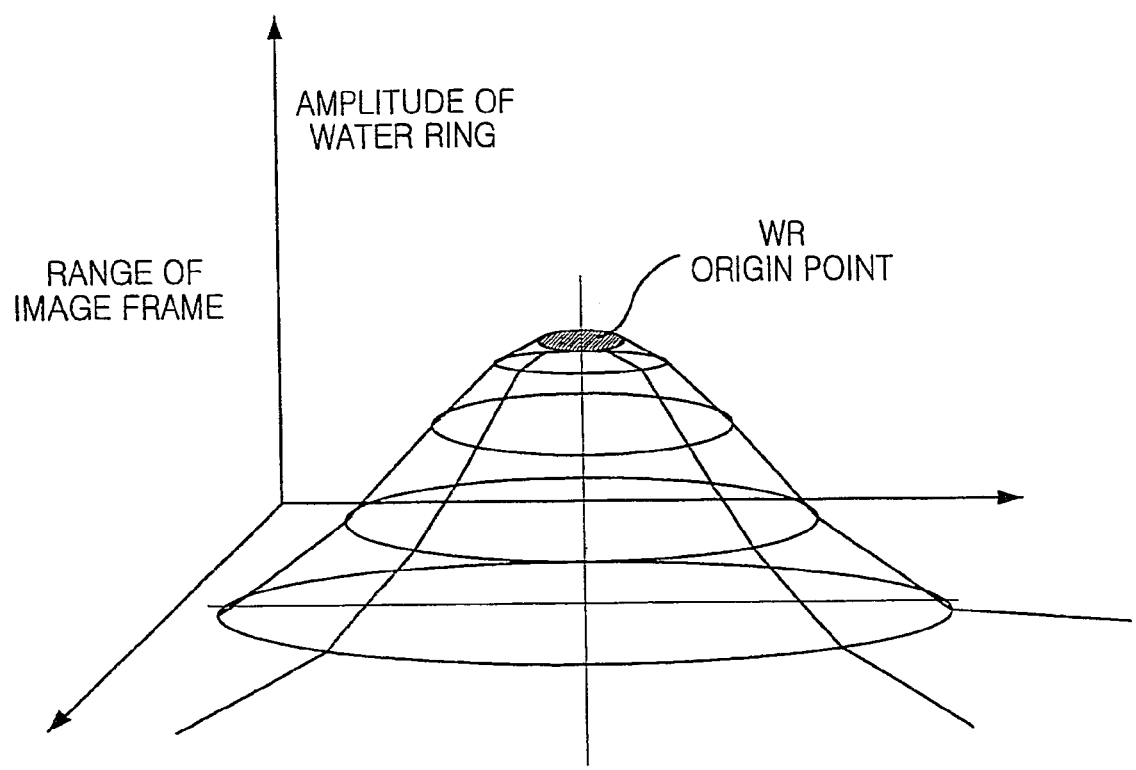
FIG. 4 is a graph describing the relationship between the significance of an image area and the amplitude of a water ring.

FIG. 4 is a graph describing the relationship between the significance of an image area and the amplitude of a water ring. As shown in the drawing, the amplitude of the water ring at the water ring origin point is the largest, and the amplitude of water rings is in inverse proportion to the distance from the water ring origin point. That is, the water rings becomes smaller as they go further from the water ring origin point. In the present invention, the data in the water ring origin point are encoded and transmitted on a top priority in a high image quality, and as it goes to the outskirt of the image, the image quality is degraded gracefully, thus improving an image improvement suitably for a human visual system stressing out the significant part of an image.

For example, when the central part of an image is the water ring origin point (in most cases, the most interesting object comes at the center of a screen during photographing), the data of the central area are transmitted with priority and the image quality of the central area is enhanced. This is because they are the most significant to a user. In the image on the outskirt, the user becomes less interested. So, the priority of the data on the outskirt area is decreased, and the image quality is degraded gracefully. Therefore, the transmission bit rate remains the same as the conventional image/moving image encoding method, while the image quality of the significant area is guaranteed in the receiving end.

Figure 5:
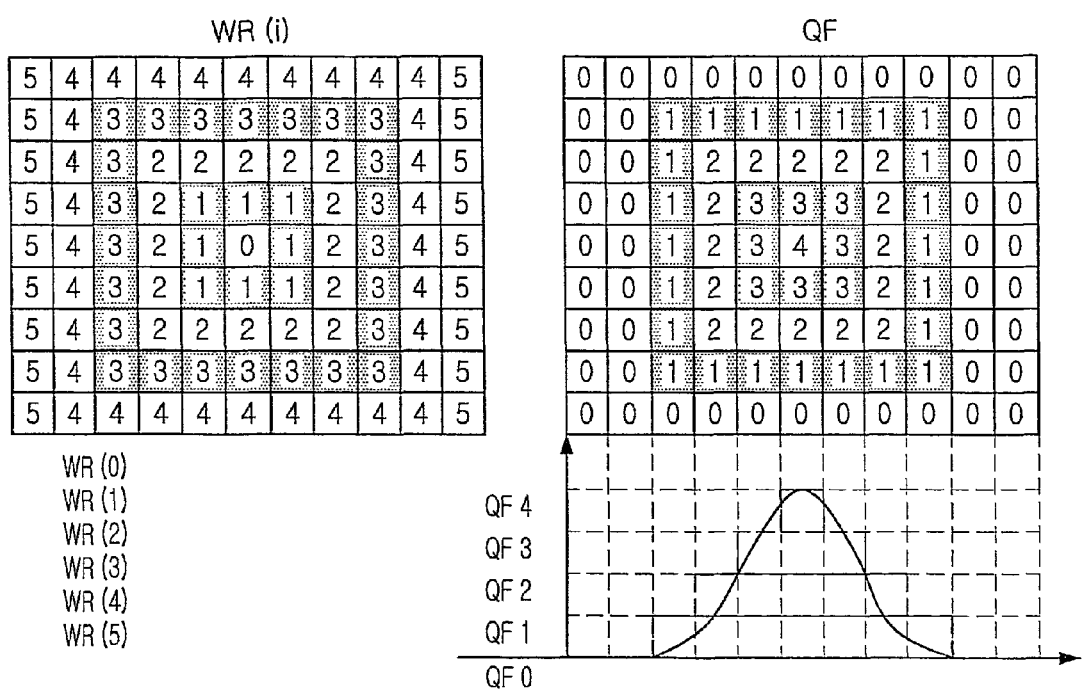
FIG. 5 is a diagram describing the relationship between the water ring origin point and the quality factor (QF), which is based on the significance in each image part.

FIG. 5 is a diagram describing the relationship between the water ring origin point and the quality factor (QF), which is based on the significance in each image part. In the drawing, when the maximum QF is given as 4 and the image data in the water ring origin point is assumed to be the most significant, the maximum QF value 4 is assigned to the water ring (0), 3 to the water ring (1), 2 to the water ring (2), 1 to the QF of the water ring (3), and 0 to the water ring beyond the water ring (3). An image is encoded based on the given QF. Here, the encoder performs encoding from the water ring (0) and then, it transmits the image data of each water ring to the decoder so that the decoder could perform decoding. In the decoding process, if QF values are predetermined already or transmitted to the decoder, decoding can be performed based on the QF values. Accordingly, the image data in the most significant area can be transmitted/received on a top priority, and the quality of the image area can be improved intelligently as well.

Figure 6A:
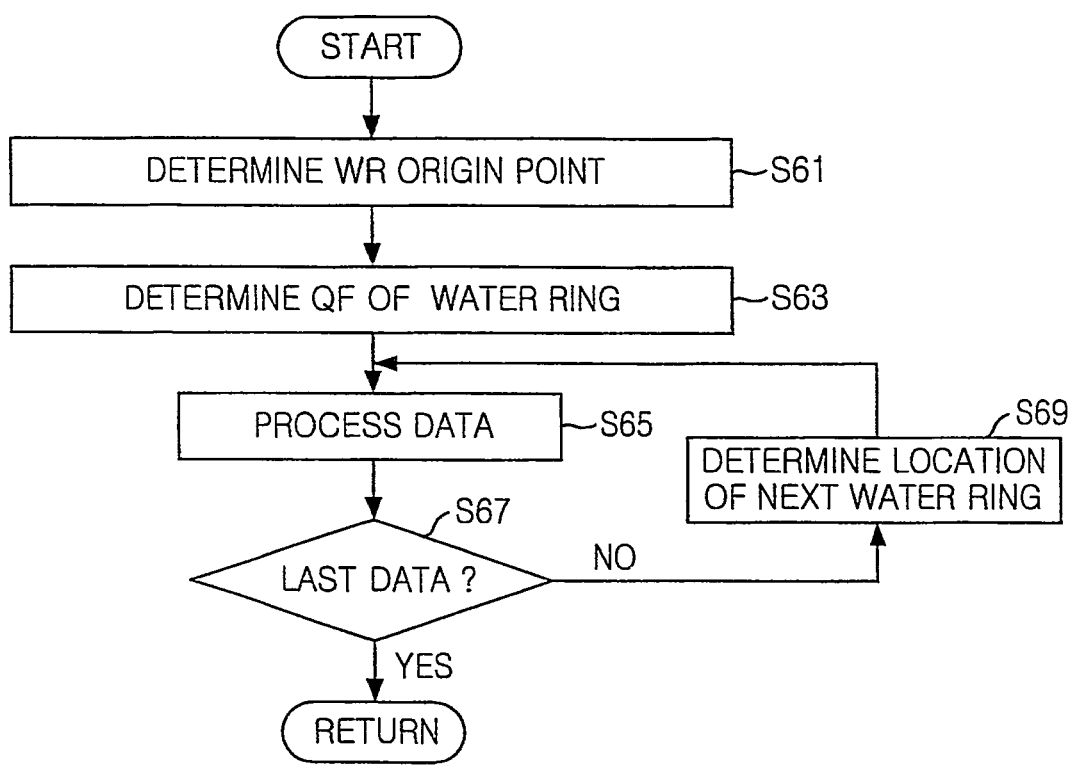
FIG. 6A is a flow chart describing the data processing using QF-based water ring scanning.
Figure 6B:
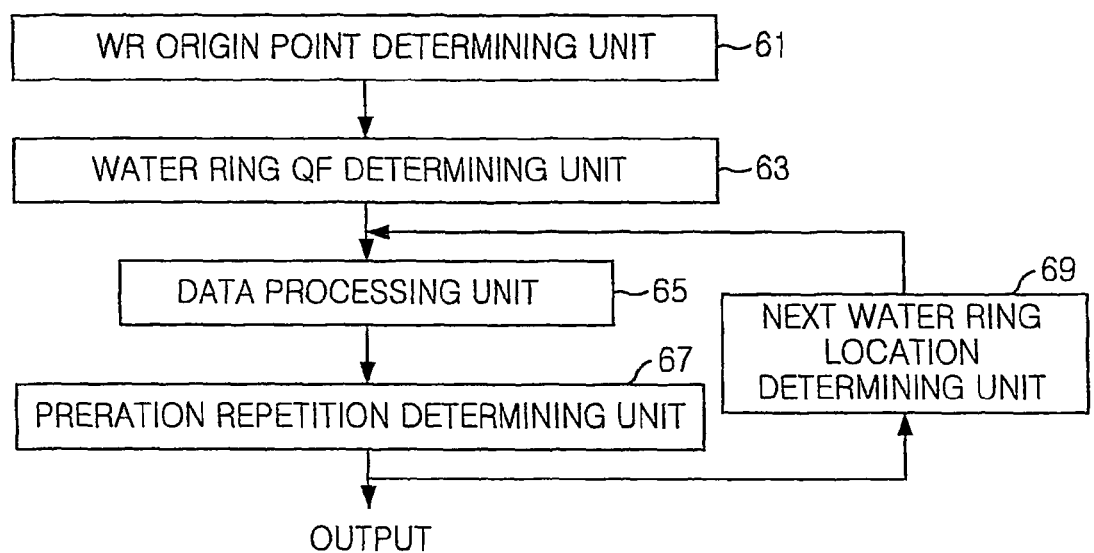
FIG. 6B is a structural diagram depicting a QF-based water ring scan apparatus in accordance with an embodiment of the present invention.

FIGS. 6 to 8 are flow charts showing an intelligent water ring scan apparatus and method thereof in accordance with an embodiment of the present invention. FIG. 6A is a flow chart describing the data processing using QF-based water ring scanning, and FIG. 6B is a structural diagram depicting a QF-based water ring scan apparatus in accordance with an embodiment of the present invention. The water ring scan apparatus includes a water ring origin point determining unit for determining the location of a water ring (0) in an image frame, a water ring QF determining unit for determining a QF value based on the significance of a water ring, a data processing unit for performing encoding/decoding and data transmission/reception, a water ring location determining unit for determining the location of a water ring (i) from the water ring origin point (i.e., the water ring (0)), and an operation repetition determining unit for activating the water ring location determining unit and the data processing unit repeatedly until all data in the current input image frame are processed.

The preferred embodiments of FIGS. 6A and 6B show how the encoding and transmission of the image data are synchronized in different water ring scan methods.

At step S61, a water ring origin point is determined arbitrarily in the water ring origin point determining unit 61. At step S63, a QF value is determined based on the significance of an image area in the water ring QF determining unit 63. Subsequently, at step S65, the image data are processed based on the QF value in the data processing unit 65. Here, data processing in the encoder means data encoding and transmission, and that in the decoder denotes data reception and decoding. At step S67, it is determined in the operation repetition determining unit 67 whether all the image data are processed. If the last data of the image is processed, the operation finishes, or if not, the logic flow goes to the step S69 and then the location of the next water ring, such as a water ring (1), water ring (2) . . . , and water ring (i), is determined in the water ring location determining unit 69. At the step S65, data processing is performed again for the new water ring.

Figure 7A:
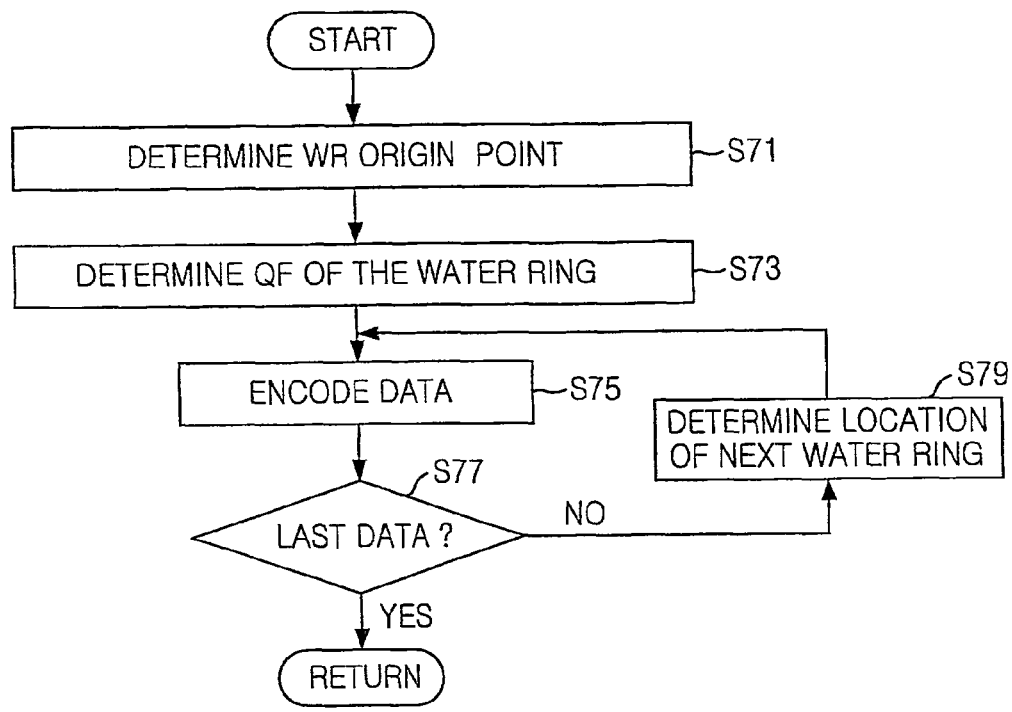
FIG. 7A is a flow chart describing the encoding process using QF-based water ring scanning in accordance with another embodiment of the present invention.
Figure 7B:
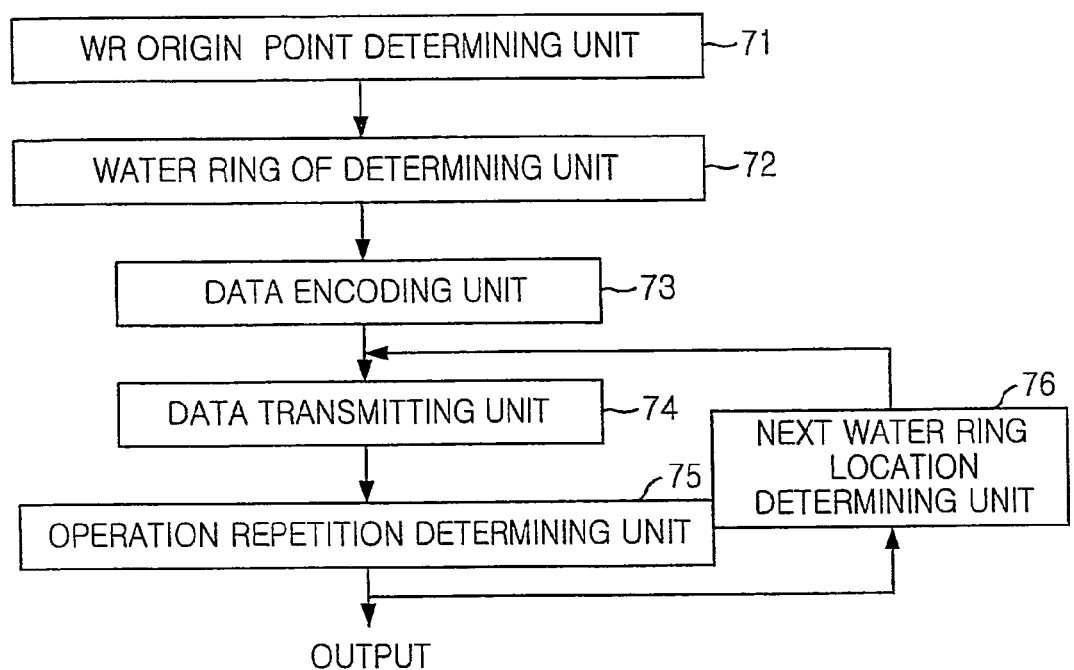
FIG. 7B is a structural diagram showing the encoder of FIG. 7A.
Figure 8A:
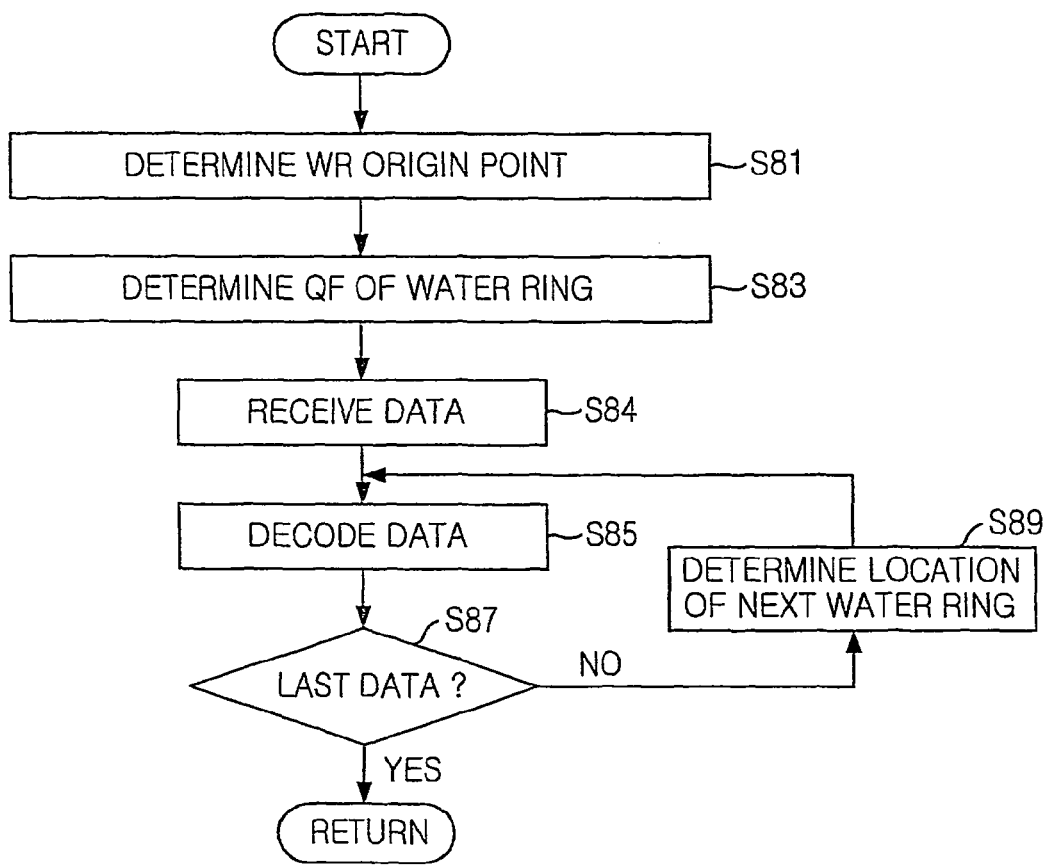
FIG. 8A is a flow chart illustrating the decoding process using QF-based water ring scanning in accordance with another embodiment of the present invention.

FIG. 7A is a flow chart describing the encoding process using QF-based water ring scanning in accordance with another embodiment of the present invention, and FIG. 7B is a structural diagram showing the encoder of FIG. 7A. FIG. 8A is a flow chart illustrating the decoding process using QF-based water ring scanning in accordance with another embodiment of the present invention, and FIG. 8B is a structural diagram showing the decoder of FIG. 8A.

In this embodiment, an input image is encoded in a raster scan order, while the data transmission, reception and decoding are all performed in a water ring scan order. Here, QF is determined based on each water ring.

As illustrated in FIGS. 7A and 7B, at step S61, a water ring origin point (i.e., water ring (0)) is determined in the water ring origin point determining unit 61. Then, at step S63, a QF value is determined in the water ring QF determining unit 63 based on the significance of the image area. At step S71, the entire input image frame is encoded from the water ring origin point by applying the QF value, and at step S73, the data transmission unit 73 transmits the result of the data processing at the water ring area. Here, encoding is carried out using an arbitrary scanning method. Subsequently, at step S67, it is determined in the operation repetition determining unit 67 whether all the data are processed to the last data, and if the last data is processed, the operation ends. If the last data is not processed, at Step S69, the next water ring that neighbors the outskirt of the preceding water ring, such as a water ring (1), water ring (2), . . . , water ring (i), is determined in the water ring location determining unit 69, and the operation is repeated from the step 73, in which the data of the corresponding water ring are transmitted.

Figure 8B:
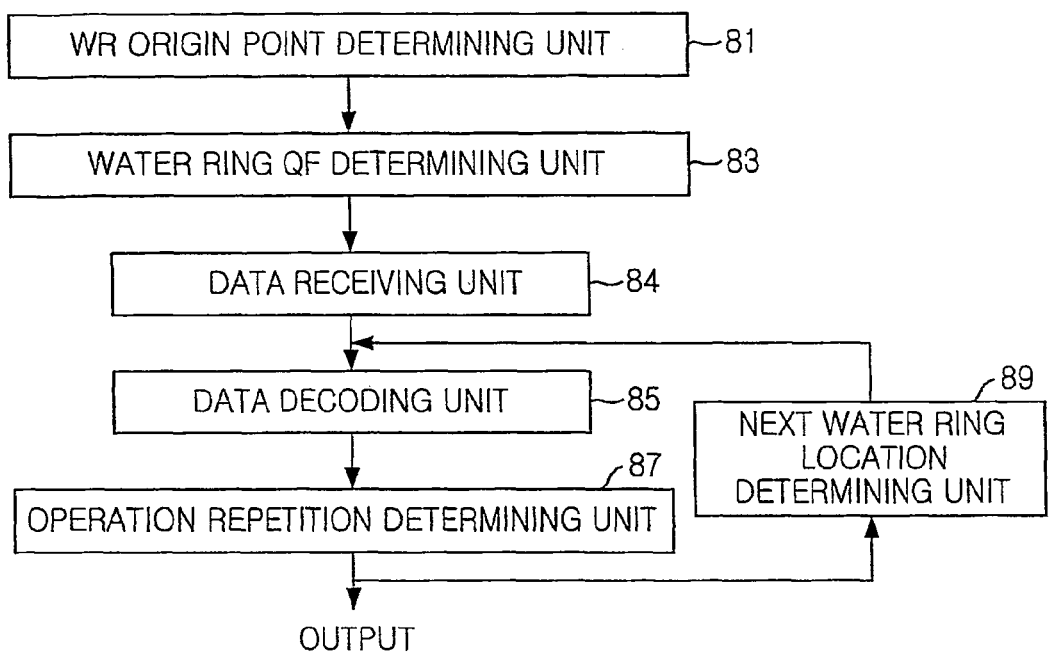
FIG. 8B is a structural diagram showing the decoder of FIG. 8A.

Referring to FIGS. 8A and 8B, decoding is performed as follows. At step S81, an arbitrary water ring origin point, i.e., a water ring (0), is determined in the water ring origin point determining unit 81. The location of the water ring (0) is determined by checking out the location of the water ring (0), which is already stored in the decoder, or by receiving information on the location of the water ring (0), whenever image data are received from the encoder. At step S83, a QF value is determined in the water ring QF determining unit 83 based on the significance of the image area. A QF value is determined by checking out the QF values that are already stored in the decoder, or by receiving QF values, whenever new image data are received from the encoder. At step S84, the data reception unit 84 receives the transmission bit streams of the corresponding water ring, and at step S85, decoding is carried out in the data decoding unit 85 by using the QF value, which is determined in each water ring. Subsequently, at step S87, it is determined in the operation repetition determining unit 87 whether the last data is processed. If the last data is processed, the operation ends, or if not, the location of the next water ring that neighbors the outskirt of the preceding water ring, such as a water ring (1), water ring (2), . . . , water ring (i), is determined, and the data receiving process (step S84) and the data decoding process (step S87) are repeated for the new water ring whose location is determined in the above.

In short, the intelligent water ring scan apparatus in accordance with an embodiment of the present invention comprises a water ring origin point determining unit for determining a water ring (0), i.e., the water ring origin point which is visually significant and needs to be processed with priority; a water ring QF determining unit for determining a QF value based on the significance of a water ring; a data processing unit for performing encoding/decoding and transmission/reception based on the determined QF value; a water ring location determining unit for determining the location of a water ring (i) that is generated in the $i^{th}$ from the water ring origin point (i.e., water ring (0))—for example, the next quadrate water ring area to be scanned (i.e., water ring (1)) that surrounds the current water ring origin point (i.e., water ring (0)), or the next quadrate water ring area to be scanned (i.e., water ring (i)) that surrounds the preceding water ring (i−1); and an operation repetition determining unit for activating the water ring location determining unit and the data processing unit repeatedly until all the data in the current input image frame are processed.

The water ring origin point determining unit, water ring QF determining unit, water ring location determining unit, data encoding unit and data transmission unit will be described in detail, hereinafter.

Water Ring Origin Point Determining Unit

In the water ring origin point determining unit, a water ring origin point is determined arbitrarily in three methods:

1. The central area is predetermined to be water ring origin point.

A water ring origin point is already determined to be the central part of an image frame, because the most significant object usually comes at the center in most cases. If the central part (pixels, blocks or macro blocks) of the image frame is already determined to be the water ring origin point, the image data in the water ring origin point need not be transmitted from the encoder to the decoder, because the encoder and the decoder already knows where the water ring origin point is.

2. An arbitrary spot of an image frame is predetermined to be the water ring origin point.

An arbitrary area (pixel, block or macro block) of an image frame to be transmitted is already determined as a water ring origin point between the encoder and the decoder. Here, the water ring scanning is performed from the arbitrarily determined origin point by transmitting the image data at the origin point along with a header, when an image sequence is transmitted.

In case where the size of an image is 2000×2000 pixels in maximum, and the water ring scan order is applied to every macro block, the image data in an arbitrary macro block-based water ring origin point, which are 7 bits on the x axis and 7 bits on the y axis, are transmitted from the encoder to the decoder along with a sequence header. Then, the decoder can locate the water ring origin point from the received information on the water ring origin point.

3. The water ring origin point is changed in each image frame.

If the location of the main object is variable in an image sequence, the water ring origin point arbitrarily determined in each image frame should be transmitted from the encoder to the decoder at every image frame. Here, the information on the arbitrarily determined water ring origin point is included in the header and transmitted together with it in each image frame. The embodiments for this method are as follows:

a) a method of transmitting the absolute coordinates of a water ring origin point determined arbitrarily to the decoder along with a header in each image frame.

b) a method of reducing the amount of data transmission by transmitting the information on relative coordinates from a certain fixed image location, such as the central part of the image.

c) a method of reducing the amount of data transmission by transmitting relative coordinates from the water ring origin point of the preceding image frame.

Figure 9A:
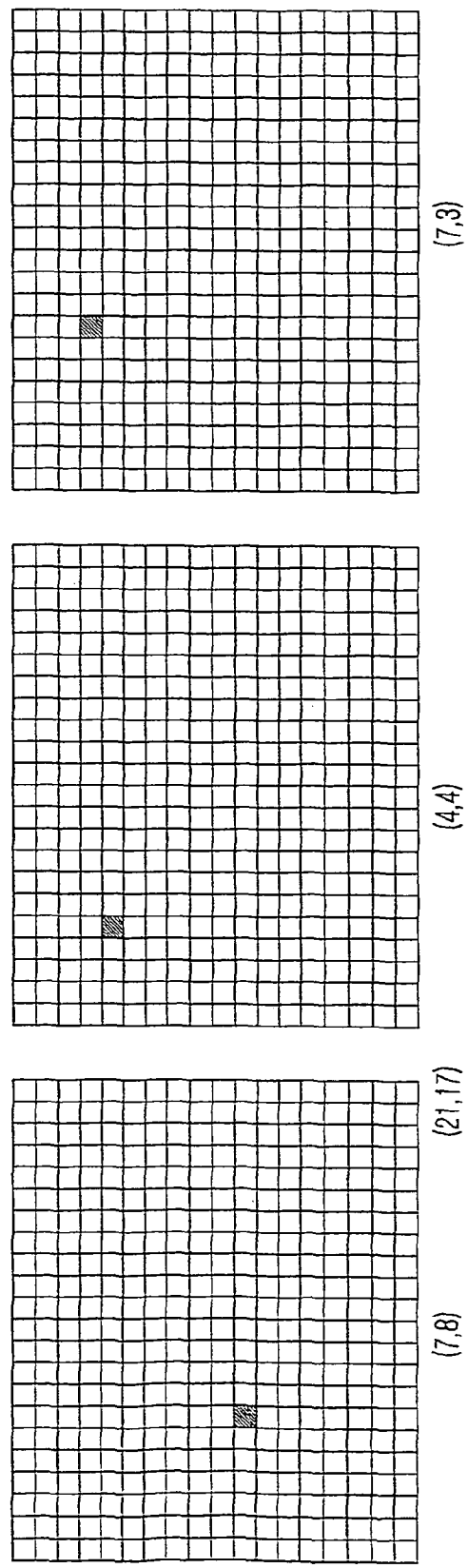
FIG. 9A is a diagram describing the absolute coordinates of a water ring origin point.
Figure 9B:
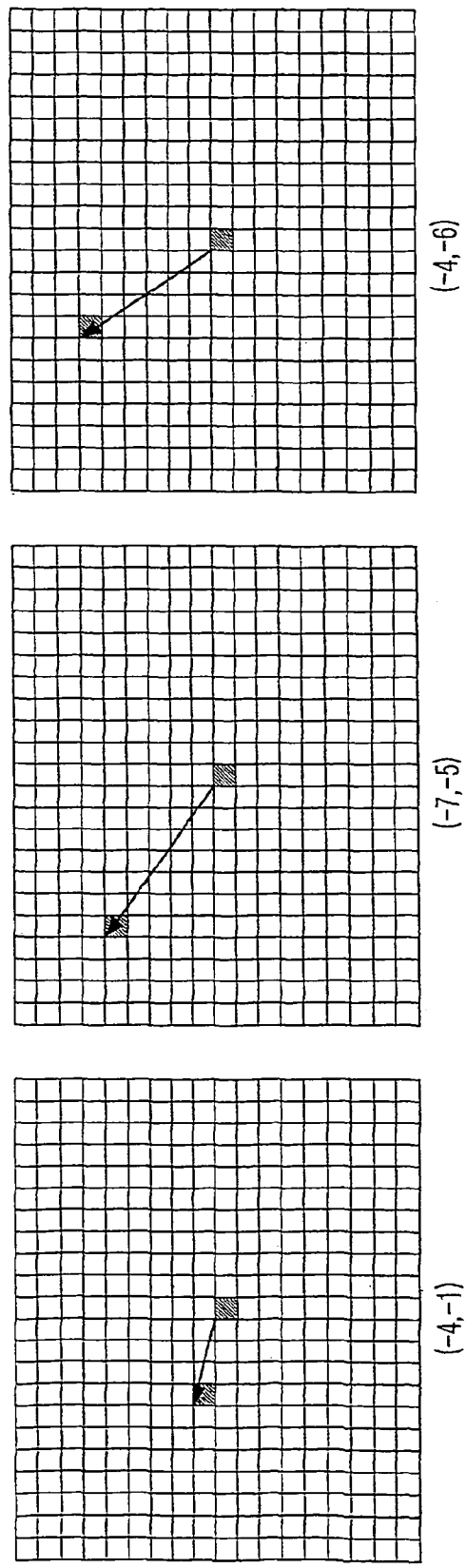
FIG. 9B is a diagram illustrating the relative coordinates from the central part of the image, which is set up as a water ring origin point.
Figure 9C:
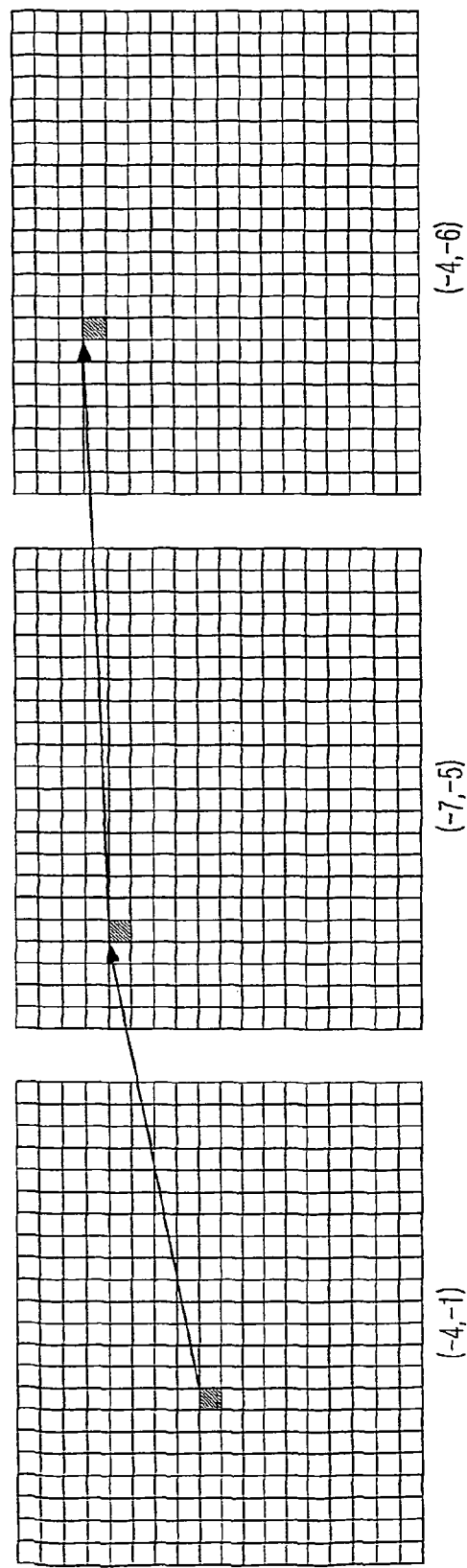
FIG. 9C is a diagram showing the relative coordinates from the water ring origin point of the preceding image frame.

FIG. 9A is a diagram describing the absolute coordinates of a water ring origin point, and FIG. 9B is a diagram illustrating the relative coordinates from the central part of an image frame which is set up as a water ring origin point. FIG. 9C is a diagram showing the relative coordinates from the water ring origin point of the preceding image frame. The above three embodiments a), b), and c) are illustrated in FIGS. 9A, 9B, and 9C.

Water Ring QF Determining Unit

The water ring QF determining unit for improving the image quality suitably for the human visual system based on each water ring will be described more in detail.

First, when a water ring origin point (water ring (0)) is determined in the water ring origin point determining unit 61 or 81, or the next water ring (water ring (i)) surrounding the current water ring is determined in the water ring location determining unit 69 or 89, a QF value should be determined in the water ring QF determining unit 63 or 83 based on the significance of the image in the water ring. The determined QF value of a water ring (i) is used to encode/decode image data and to improve their image quality suitably for the human visual system. The water ring QF determining unit 63 or 83 for improving image quality suitably for the human visual system is used as follows.

Figure 10:
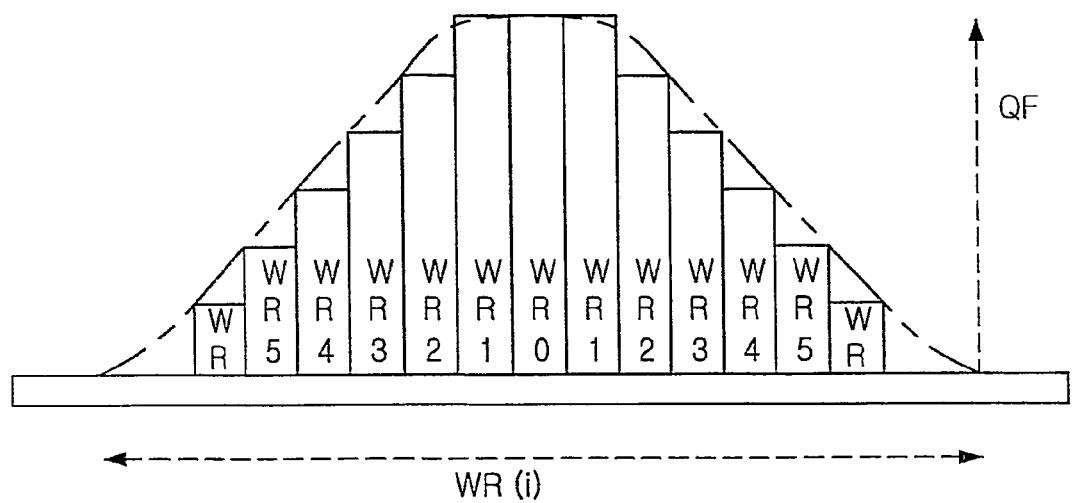
FIG. 10 is a diagram illustrating the relationship between a water ring (i) and QF.

FIG. 10 is a diagram illustrating the relationship between a water ring (i) and QF. A different QF value is applied to each water ring (i) to improve image quality suitably for the human visual system. This relationship between a water ring (i) and QF is illustrated in the graph of FIG. 10. Since the water ring (0) and the water ring (1) have relatively significant image data, the maximum QF values are assigned thereto and to the other water rings, smaller QF values are assigned.

A QF value for each water ring (i) can be determined by using a table that is selected by a user, or by using a mathematical model. In case of using a method that uses a user-selected QF table, the request from user can be accommodated precisely. On the other hand, in case of the latter method which uses a mathematical model, the overhead added to transmission bit stream is reduced relatively. In this invention, both two methods will be considered.

1. Method of Using a QF Table for Each Water Ring (i)

The QF value for each water ring (i) in the encoder and the decoder can be synchronized with each other by transmitting a water ring-QF table from the encoder to the decoder or by using a water ring-QF table already stored in the encoder and decoder.

<Method A> This method uses the same water ring-QF table already stored in both encoder and decoder.

An embodiment of a water ring(i)-QF table is illustrated in FIG. 11. In the drawing, the maximum QF value is set up at 4. Therefore, the QF value for the water ring (0) is 4, the maximum value, and QF for the water ring (1) becomes 3. The QF values for the water ring (3) and the water ring (4) are 2 and 1, respectively, and all the other water rings beyond the water ring (4) have the QF value of 0. In the method A, the QF values are determined by storing a reference table that is similar to that of FIG. 11 in the encoder and the decoder.

<Method B> In the method B, a QF table is inserted in a sequence header, whenever each image sequence is transmitted from the encoder and the decoder.

<Method C> This method is used when the QF values need to be changed in each image frame. When an image frame is transmitted, a water ring(i)-QF table suitable for the image frame is transmitted.

In case of the methods B and C, QF information is synchronized by including a QF table information as shown in FIG. 11 in a sequence header or frame header and transmitting it from the encoder to the decoder. In the process of transmitting the QF table information, various methods for reducing the amount of data bits are used.

Figure 12:
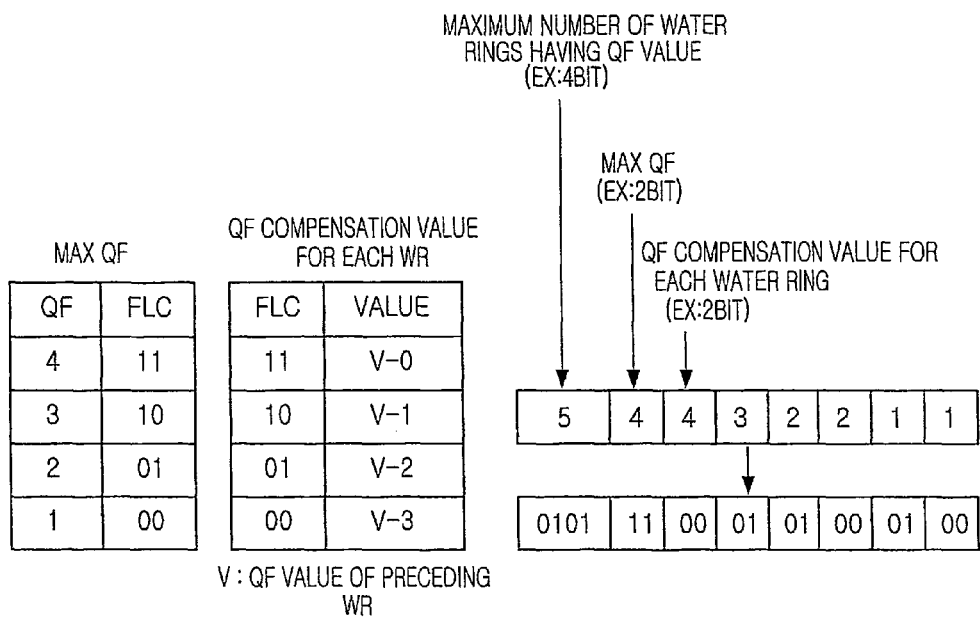
FIG. 12 shows a fixed length encoding (FLC) table, which is a sort of water ring(i)-QF tables transmitted from the encoder to the decoder.

FIG. 12 shows a fixed length encoding (FLC) table, which is a kind of water ring(i)-QF tables transmitted from the encoder to the decoder. An embodiment of transmitting an FLC table to the decoder is illustrated in FIG. 12. The water ring(i)-QF table information is synchronized by transmitting the number of water rings having a QF value, the maximum QF value, and the QF value of each water ring from the encoder to the decoder.

As shown in the drawing, if the decoder knows the number of water rings (i) having a QF value, it can process the QF value of the water rings that comes after the i+1$^{th}$ water ring into 0. In this embodiment, if four bits are assigned as FLC of the maximum QF, it means that $2^4$ water rings, which is 16, can have a QF value. Here, if the number of water rings having QF is 5, the decoder recognizes that the water ring (0), water ring (1), water ring (2), water ring (3), water ring (4), and water ring (5) have a QF value that is not 0, and receives the QF values for the five water rings and no more. The other water rings after the water ring (6) comes to have the QF value of 0. If more QF values need to be assigned, you can increase the number of bits more than four bits. FIG. 12 shows a case where the maximum QF value is 4. Here, two bits are assigned. As shown in the drawing, if the decoder knows the number of water rings having a QF value and the maximum QF value, the decoder determines the QF value for each water ring based on the water ring-QF FLC table. In case where the water ring-QF table of FIG. 11 needs to be transmitted, the QF table can be transmitted by assigning 18 bits, just as shown in the right figure of FIG. 12. This just shows only one embodiment. A QF table can be determined between the encoder and the decoder, or transmitted, in various methods.

Figure 13:
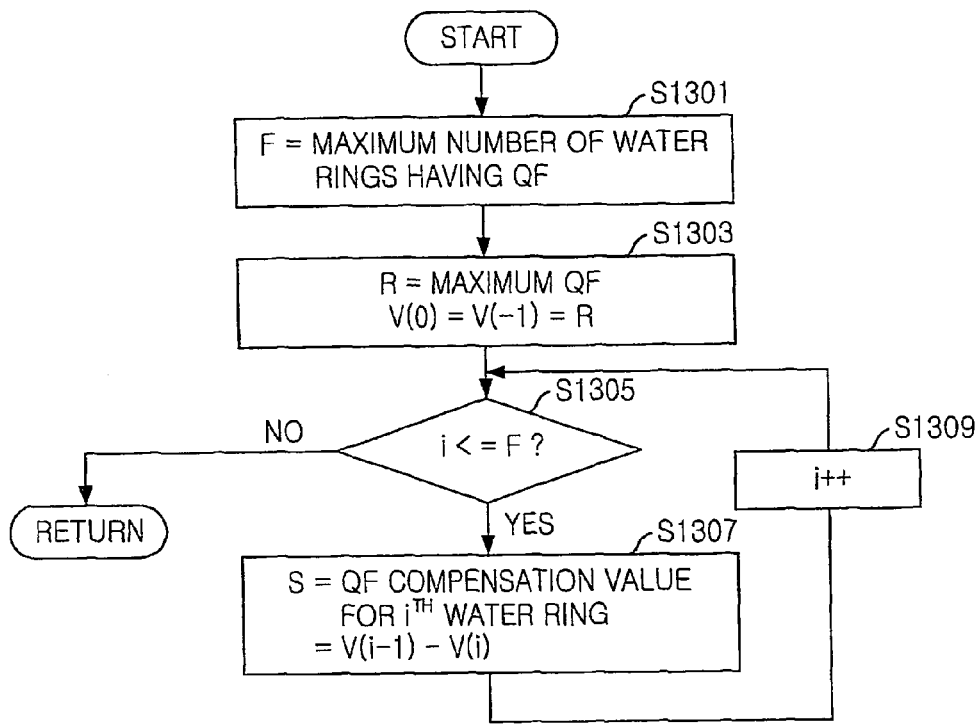
FIG. 13 is a flow chart describing the process for generating the FLC table of FIG. 12 in accordance with an embodiment of the present invention.

FIG. 13 is a flow chart describing the process for generating the FLC table of FIG. 12 in accordance with an embodiment of the present invention. The FLC table generation process is part of the method that transmits a water ring(i)-QF table from the encoder to the decoder. In the drawing, at steps S1301 and S1303, when the number (F) of water rings having a QF value and the maximum QF value (R) are determined, the initial QF value of the water ring (0) (V(0)=R, S1303) is assigned as the input value (R). Meanwhile, at step S1303, the input value (R) is assigned to the water ring (−1) as a dummy for calculating the QF compensation value (V(−1)=R).

At steps S1305, S1306 and S1309, the difference between the QF value of the preceding water ring (V(i−1)) and that of the current water ring is calculated using the QF compensation value repeatedly as long as the index i does not exceeds the maximum number (F) of water rings having QF. Through this process, the FLC QF table of FIG. 12 can be created. Then, when the water ring-QF table needs to be transmitted from the encoder to the decoder, SYNTAX that corresponds to the flow chart of FIG. 13 can be included in the transmission bit stream.

Figure 14:
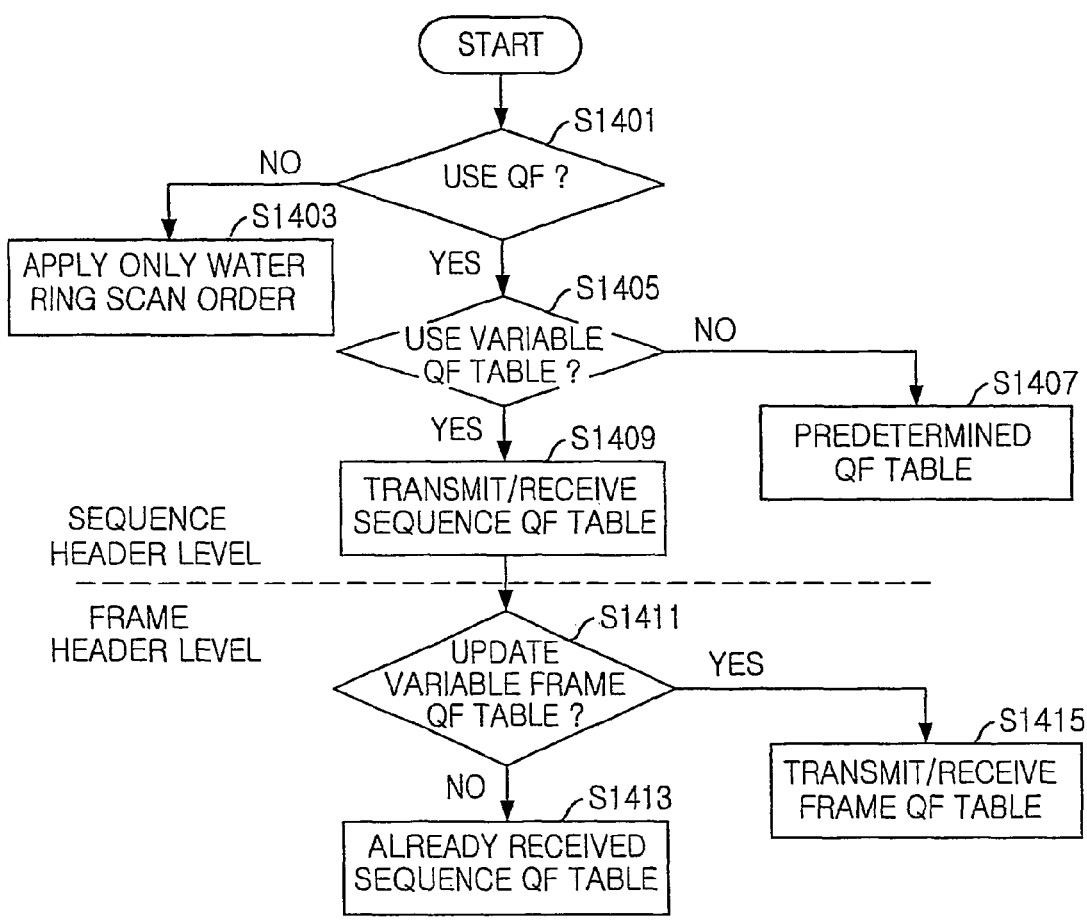
FIG. 14 is a flow chart describing the process of using a water ring(i)-QF table.

FIG. 14 is a flow chart describing the process of using a water ring(i)-QF table. The flow chart of FIG. 14 shows an encoder and a decoder that use a water ring(i)-QF table in all the cases where the same water ring(i)-QF table exists in both encoder and decoder, where the water ring(i)-QF table is included in a sequence header and transmitted to the decoder when an image sequence is transmitted from the encoder to the decoder, and where the water ring(i)-QF table for each image frame is transmitted whenever an image frame is transmitted.

As illustrated in the drawing, at step S1401, it is determined whether to use a QF value for each water ring above the sequence header level. In case where the water ring-based QF values are not used, at step S1403, an image is encoded transmitted, received and decoded using the water ring scan order only. If the water ring-based QF values are used in the step S1401, at step S1405, it is determined whether to use a variable QF table, and if the variable QF table is not received, at step S1407, the same water ring-QF table stored in both encoder and decoder is used to perform encoding, transmission, reception, and decoding. If a variable QF table is used at step S1405, at step S1409, the encoding and decoding are preformed by receiving/transmitting a QF table for each image sequence and using the QF table corresponding to each image sequence.

At step S1411, in the frame header level, it is determined whether to update a variable QF table based on each frame. If the frame-based variable QF table is not updated, at step S1413, the encoding and decoding are carried out by using the sequence-based QF table that has already been transmitted. If the frame-based variable QF table is updated, the QF table of the corresponding frame is updated accordingly at step S1415.

To form the apparatus illustrated in the flow chart of FIG. 14 and perform the method, SNTAX for carrying out the operation in the sequence header level and the frame header level may be added to the bit stream architecture.

2. Method of Determining QF Based on a QF Model

An appropriate QF value for improving image quality suitably for the human visual system can be determined by using a mathematical model set up between the encoder and the decoder. As for a mathematical model that is suitable for human visual system, Gaussian Function may be used. To determine QF, the function can be expressed as follows.

$$QF_{Value} = \text{ROUND}\left(QF_{\text{Max}} \times e^{\frac{-i^2}{QF_{Factor}^2}}\right) \qquad \text{Eq. (1)}$$

Here, i denotes the index of a water ring (i). To obtain a QF value ($QF_{value}$), model parameters should be inputted, i.e., $QF_{Max}$ and $QF_{Factor}$. For the $QF_{Max}$, the maximum QF value is inputted, and for $QF_{Factor}$, the variance value is inputted to the Gaussian function. The $QF_{Factor}$ is used to control the spreading of QF.

Figure 15B:
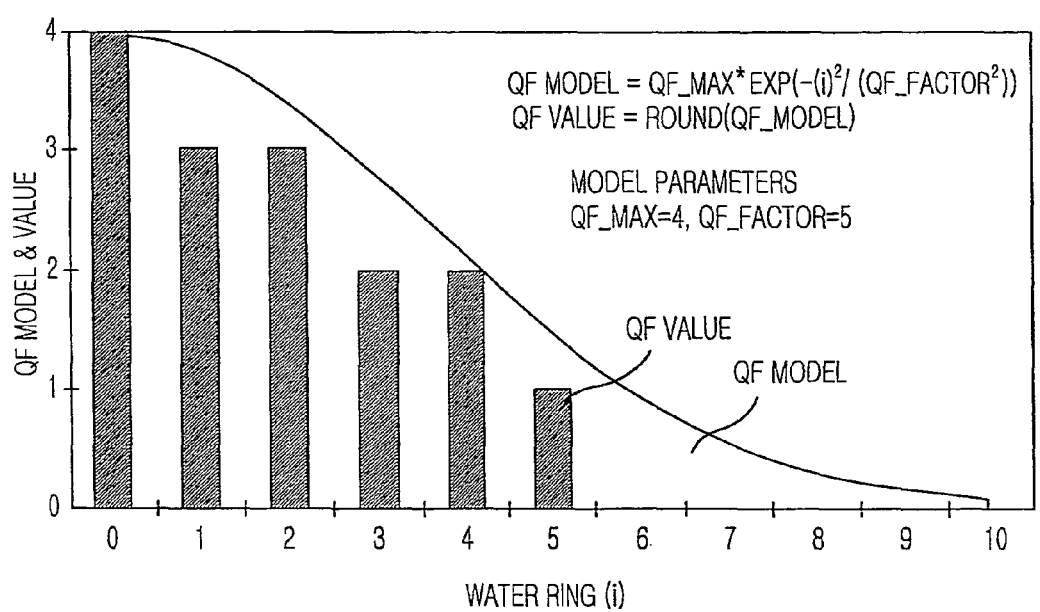

FIG. 15 is a table describing the result of applying parameters to a QF determining model. An embodiment of Equation 1 is illustrated in FIG. 15. FIG. 15A shows an embodiment where QF-related parameters are applied to a QF determining model, and FIG. 15B illustrates the result of using the QF-related parameters in FIG. 15A into a graph. The QF value for each water ring can be determined just by applying two model parameters $QF_{Max}$ and $QF_{Factor}$ to the model. The mathematical model used here is not limited to Gaussian function but several other mathematical functions can be used. When i denotes the index of a water ring (i), another embodiment is expressed as follows.

$$QF_{Value} = \begin{cases} \text{ROUND}\left(\frac{1 - QF_{Max}}{QF_{Factor}} \times i + QF_{Max}\right), & i \le QF_{Factor} \\ 0, & i > QF_{Factor} \end{cases} \quad \text{Eq. (2)}$$

As shown above, when diverse mathematical models are used, there is an advantage that the overhead added to the transmission bit stream could be reduced.

In this embodiment, when two bits and four bits are applied to $QF_{Max}$ and $QF_{Factor}$, respectively, a total of six bits are required to determine a QF value. Therefore, the additional overhead is reduced remarkably than the method that uses a water ring-QF table.

Figure 16:
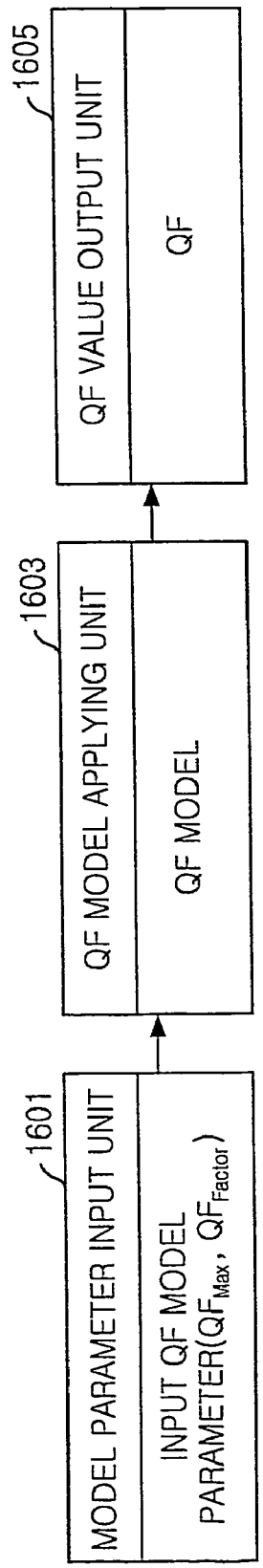
FIG. 16 is a diagram showing an apparatus and method for determining a QF value using the QF model.

FIG. 16 is a diagram showing an apparatus and method for determining a QF value using the QF model. As illustrated in FIG. 16, when the QF model parameters $QF_{Max}$ and $QF_{Factor}$ are inputted to a model parameter input unit 1601, a model mathematical equation, such as Equation 1 or 2, is used in a QF model applying unit 1603. Then, a QF value for each water ring is outputted in a QF output unit 1605, and image encoding/decoding is performed using the output QF value.

The QF determining method of the QF determining apparatus shown in FIG. 16 can synchronize the QF values between the encoder and the decoder in the same as the method using a water ring-QF table.

<Method A>

A QF value is determined by applying the QF determining parameters $QF_{Max}$ and $QF_{Factor}$ that are already stored in both encoder and decoder to the same mathematical model.

<Method B>

The parameters $QF_{Max}$ and $QF_{Factor}$ for generating a QF value are included in a sequence header and then transmitted together, when an image sequence is transmitted from the encoder to the decoder.

<Method C>

In case where a QF value needs to be changed in each image frame, the parameters $QF_{Max}$ and $QF_{Factor}$ for generating a QF value for each image frame are transmitted, whenever an image frame is transmitted.

Figure 17:
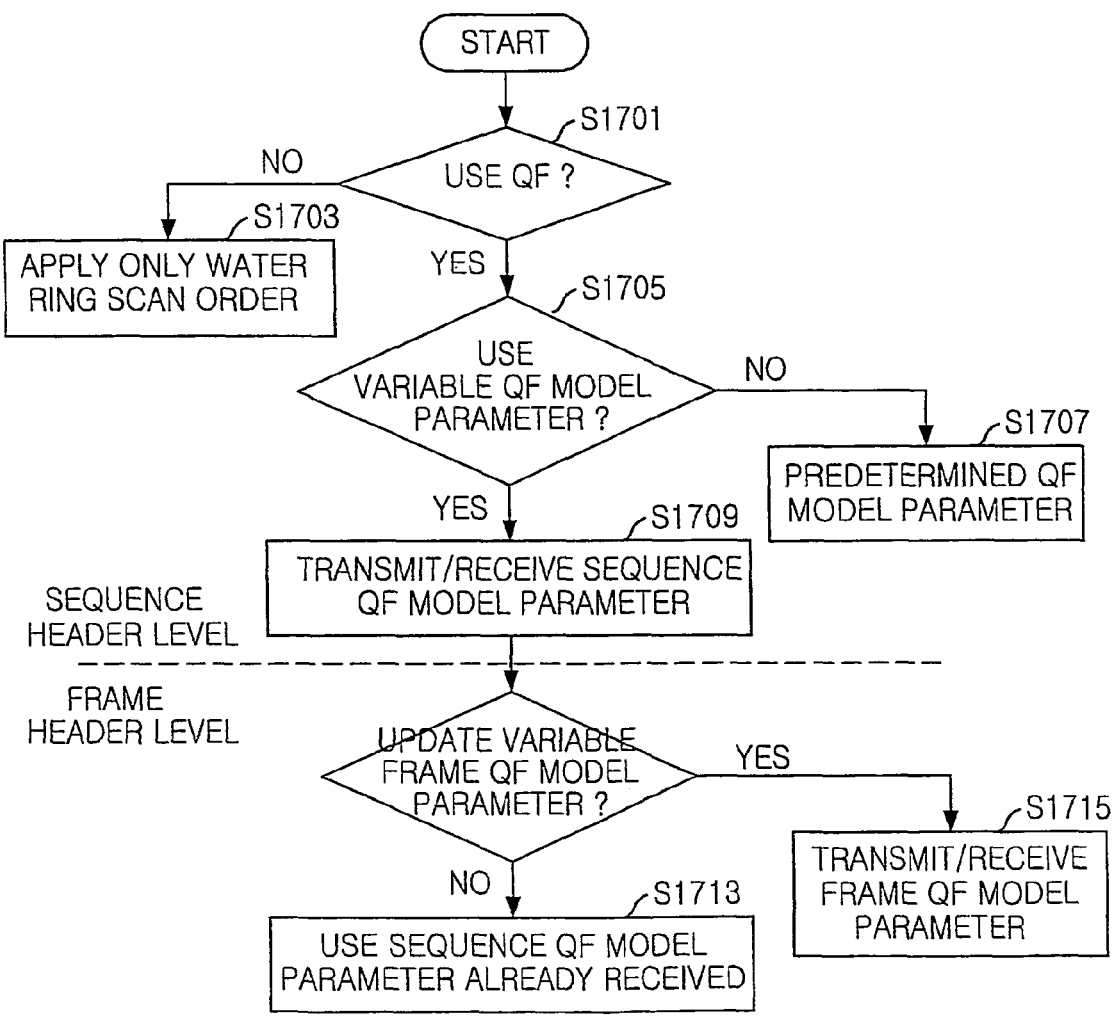
FIG. 17 is a flow chart describing a process for using a water ring (i) QF model in accordance with an embodiment of the present invention.

FIG. 17 is a flow chart describing a process for using a water ring (i) QF model in accordance with an embodiment of the present invention. The QF model parameter using the process is applied to the cases where the same water ring-based QF model parameters $QF_{Max}$ and $QF_{Factor}$ are stored in the encoder and the decoder, where the water ring-based QF model parameters $QF_{Max}$ and $QF_{Factor}$ are included in a sequence header and transmitted together, when an image sequence is transmitted from the encoder to the decoder, and where the water ring-based QF model parameters $QF_{Max}$ and $QF_{Factor}$ for each image frame are transmitted whenever an image frame is transmitted.

At step S1701, it is determined whether to use a water ring-based QF in a level above the sequence header level. If the water ring-based QF is not used, at step S1703, an image is encoded, transmitted and received by using the water ring scan order. If the water ring-based QF is used at the step S1701, at step S1705, it is determined whether to use variable QF model parameters. If the variable QF model parameters are not used, at step S1707, the same QF model parameters that are already stored in the encoder and the decoder are used to perform encoding, transmission, reception and decoding. If the variable QF model parameters are used at the step S1705, sequence-based QF model parameters are transmitted/received, and at step S1709, the encoding and decoding are performed using the QF model parameters corresponding to each image sequence.

Subsequently, at step S1711, it is determined whether to update the frame-based variable QF model parameters in the frame header level. If the frame-based variable QF model parameters are not updated, at step S1713, the encoding and decoding are carried out using the sequence-based QF model parameters that have been already transmitted. If the frame-based variable QF model parameters are updated, at step S1715, the QF model parameters of the corresponding frame are updated accordingly.

To perform the method illustrated in the flow chart of FIG. 17, or to embody the apparatus, SNTAX for performing the operation in the sequence header level and the frame header level may be added to the bit stream architecture.

Water Ring Location Determining Unit

The water ring location determining unit generates the $i^{th}$ water ring (water ring (i)). It transmits the generation location of a water ring (i) to the data processing unit to process the data within the water ring.

Figure 18:
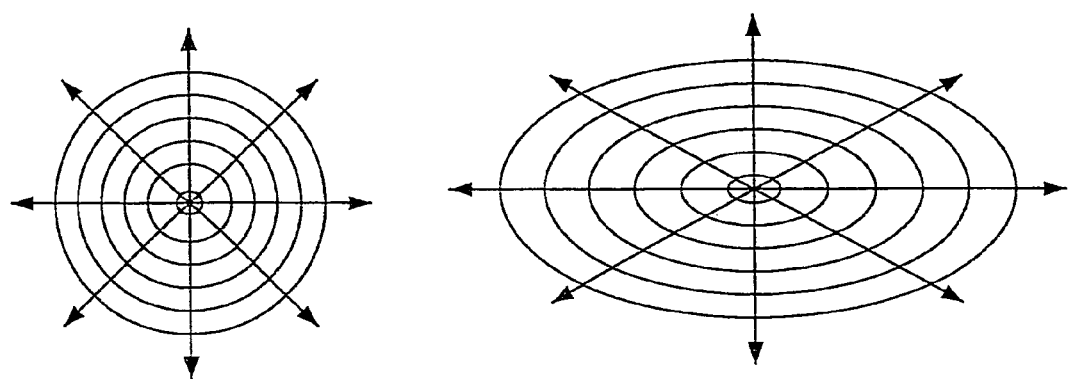
FIG. 18 is a diagram showing a type of water rings, i.e., a circular (quadrate) water ring and an elliptic (rectangular) water ring.
Figure 18:
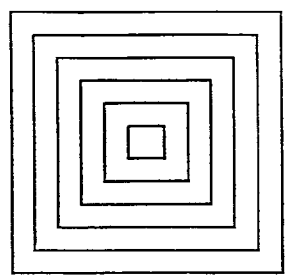
Figure 18:
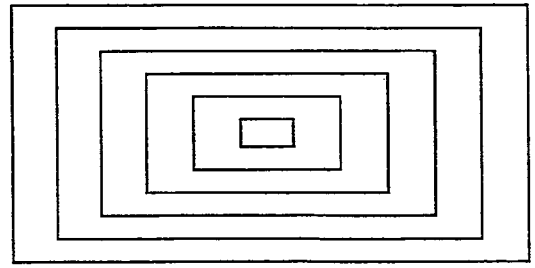

FIG. 18 is a diagram showing a type of water rings, i.e., a circular (quadrate) water ring and an elliptic (rectangular) water ring. Water rings are largely divided into a circular shape and an elliptic shape. When these are applied to image data, they are shown in the form of a quadrate or a rectangle, respectively, which is illustrated in FIG. 18. The rectangular water ring appears in a screen with a screen ratio of 16:9.

Quadrate (Circular) Water Ring Location Determining Unit

Figure 19:
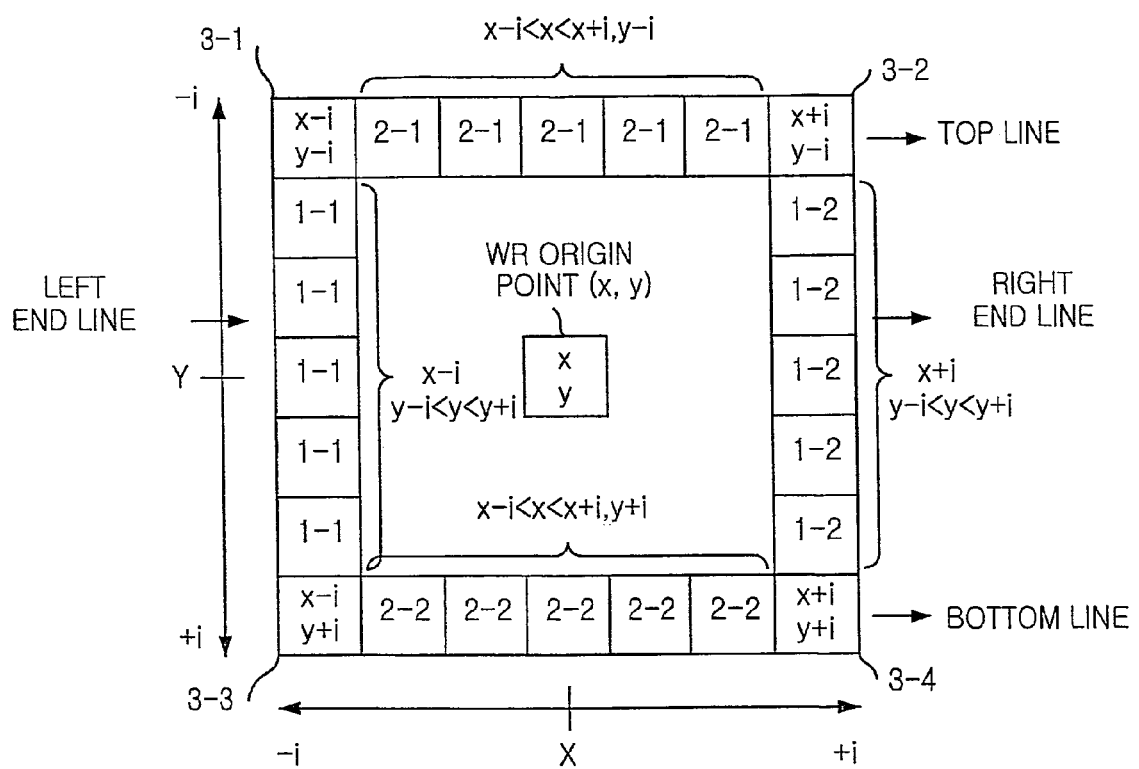
FIG. 19 is a diagram describing the generation location of the $i^{th}$ quadrate water ring.

FIG. 19 is a diagram for describing the generation location of the $i^{th}$ quadrate water ring. The location of a quadrate water ring is determined in the following method.

Step 1: Determination of Water Ring Origin Point (Water Ring (0))

An arbitrary water ring origin point (the coordinates marked as 'Water ring origin point (x,y)' in the drawing) is determined. Here, the central part of an image frame to be transmitted may be determined as a water ring origin point, or a user can determine the water ring origin point as he wishes arbitrarily.

Step 2: Determination of Water Ring (i)

The location of the $i^{th}$ water ring from the water ring origin point is determined, $i^{th}$ being the number of pixels in a pixel-based image frame, the number of blocks or macro blocks in a block or macro block-based image frame.

Step 3: Repetition of the Step 2

The process of the step 2 is repeated, until all the data in an image frame that needs to be transmitted is transmitted.

A quadrate water ring (i) is a quadrate water ring generated in the $i^{th}$ time. The water ring has an A-line (top line), a B-line (Left end line), a C-line (right end line), and a D-line (bottom line) that are composed of pixels, blocks or macro blocks.

In the drawing, the top line (A-line) includes all the pixel, block, or macro block-based image data that are apart as many units as −i from the water ring origin point on the y axis and equal to or smaller than ±i on the x axis. When the water ring origin point is (x,y), the A-line is expressed as follows.

A-Line: all data located in y−i and (x−i≦x≦x+i).

In the drawing, the location defined as left end line (B-line) includes all the pixel, block, or macro block-based image data that are apart as many units as −i from the water ring origin point on the X axis and smaller than ±i on the y axis. When the water ring origin point is (x,y), the B-line is expressed as follows.

B-Line: all data located in x−i and (y−i<y≦y+i).

In the drawing, the right end line (C-line) includes all the pixel, block, or macro block-based image data that are apart as many units as +i from the water ring origin point on the X axis and smaller than ±i on the y axis. When the water ring origin point is (x,y), the C-line is expressed as follows.

C-Line: all data located in x+i and (y−i<y<y+i).

In the drawing, the location defined as bottom line (D-line) includes all the pixel, block, or macro block-based image data that are apart as many units as +i from the water ring origin point on the y axis and equal to or smaller than ±i on the x axis. When the water ring origin point is (x,y), the D-line is expressed as follows.

D-Line: all data located in y+i and (x−i≦x≦x+i).

In a water ring (i), image data can be processed in various ways, which are represented by Raster Scan Order and Alternate Scan Order.

In the raster scan order, the data in a water ring (i) are processed from the top-left data to the bottom-right data in order. When, an image is separated into A-line, B-line, C-line and D-line, the data are water-ring scanned from left to right in the order of A-line, B-line/C-line and D-line. Here, when the data in B-line and C-line are processed, the data in the B-line and the data in the C-line are scanned alternately from left to right, and when a line is scanned up, the data in the middle lines are scanned from up to down until all the data in the middle lines are scanned. This method has an advantage that it can be applied easily.

An exemplary embodiment of the water ring location determining unit which uses the raster scan order is shown below.

```
◎ Initial parameter
    n : n^th Ring
    N : number of MB in n^th Ring
    prev_n : (n−1)^th Ring
    start_x, start_y : start position of Ring
                    (left_top X of Ring,
    left_top Y of Ring)
    curr_x, curr_y : each position of MB in Ring
    ◎ Algorithm
    Step 1 : Initial MB Fill
    n = 1;
    curr_x = start_x;
    curr_y = start_y;
    if ( InBoundary(curr_x, curr_y) )
        FillMB(start_x, start_y);
    Step 2 : Top Line MB Fill
    n++;
    N = 2*n − 1;
    prev_n = 2*(n−1) − 1;
    start_x−−;
    start_y−−;
    curr_x = start_x;
```

```
    curr_y = start_y;
    for j=1 to N {
    if( InBoundary(curr_x, curr_y) )
        FillMB(curr_x, curr_y);
        curr_x++;
    }
    Step 3 : Middle Line MB Fill
    N = prev_n;
    for j=1 to N {
        curr_x = start_x;
    curr_y = start_y + j;
    if ( InBoundary(curr_x, curr_y) )
        FillMB(curr_x, curr_y);
        curr_x + prev_n + 1;
    if ( InBoundary(curr_x, curr_y) )
            FillMB(curr_x, curr_y);
    }
    Step 4 : Bottom Line MB Fill
    N = 2*n − 1;
    curr_x = start_x;
    curr_y = start_y + prev_n + 1; for j=1 to N {
        if ( InBoundary(curr_x, curr_y) )
        FillMB(curr_x, curr_y);
        curr_x++;
    }
    Step 5
    if (not VOP Fill)
        goto Step 2.
    else
        stop
```

Meanwhile, since image data are highly related to the adjacent image data, a predictive encoding method that considers relationship between the neighboring pixels/blocks/macro blocks is used popularly among any other encoding methods.

Figure 20:
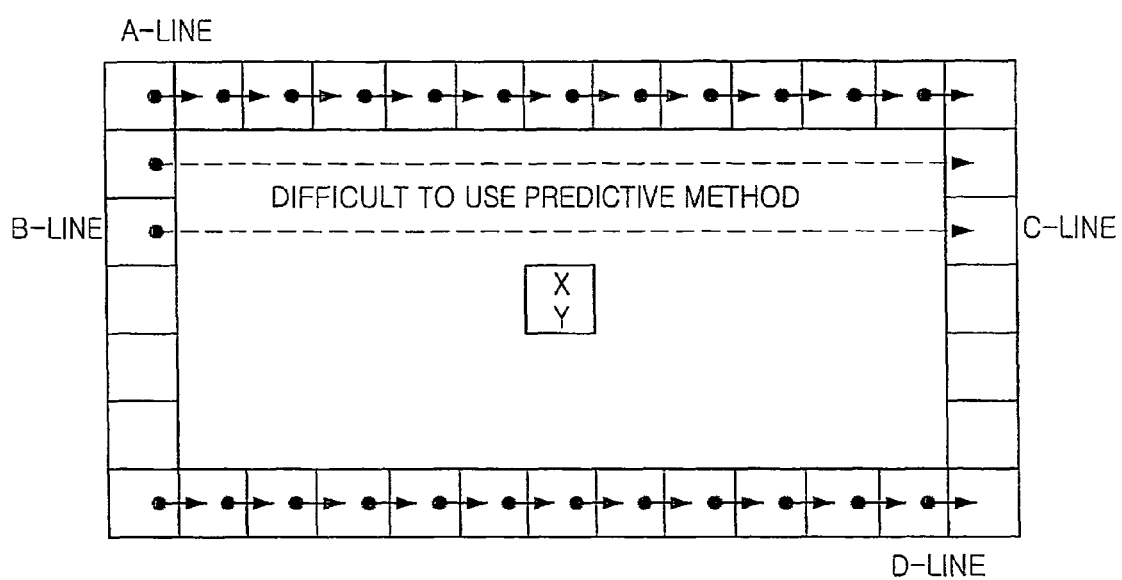
FIG. 20 is a diagram illustrating a predicted path for processing the data of the $i^{th}$ water ring by using the raster scan order, when a predictive method is used to process the neighboring data.

FIG. 20 is a diagram illustrating a predicted path for processing the data of the $i^{th}$ water ring by using the raster scan order, when a predictive method is used to process the neighboring image data. As shown in the drawing, when the data are processed using the rater scanning method, the data in the B-line and the C-line should be processed alternately. However, since the index i becomes larger, it gets harder to use the predictive encoding method in processing the neighboring image data. In case where the number of divergences is 2i, it becomes very hard to make a precise prediction.

Figure 21:
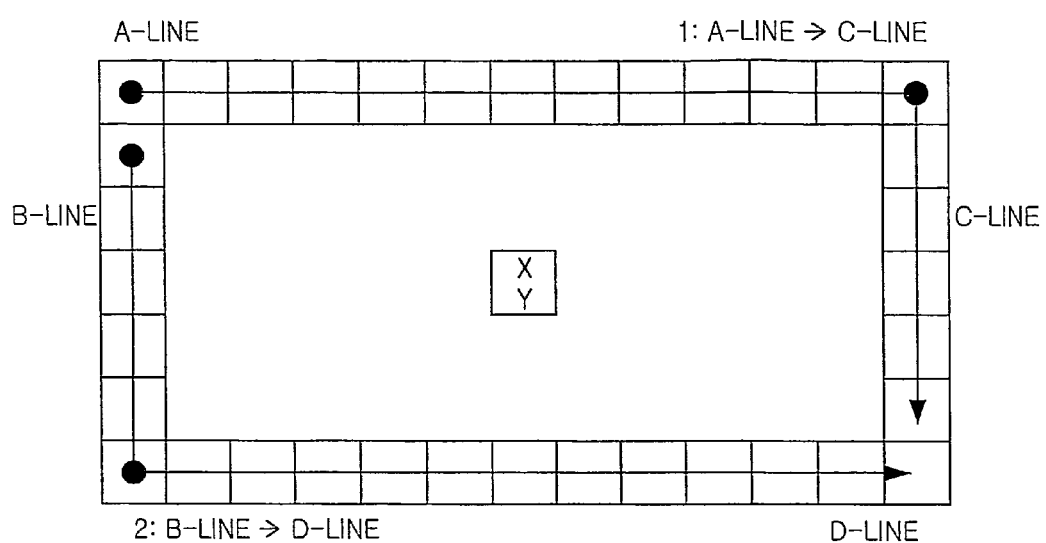
FIG. 21 is a diagram describing the data process in the water ring (i), using alternate scanning.

To solve this problem, an alternate scan order is introduced to use the predictive encoding method in processing the data of a water ring (i) easily, which is illustrated in FIG. 21. In the drawing, the data of the A-line are processed from left to right, first, and then the data in the C-line are processed from up to down. Subsequently, the data in the B-line are processed from up to down, and then the data of the D-line is processed. This method of processing image data is referred to as an alternate scanning. In the alternate scanning, the image data of a water ring (i) are processed in the order of A-line, C-line, B-line, and D-line.

Figure 22:
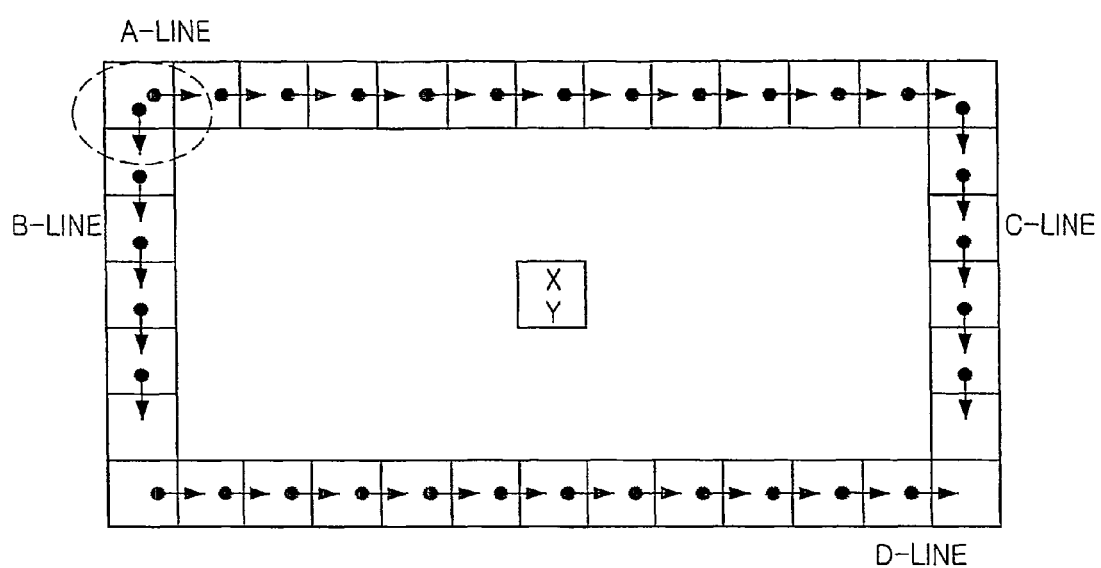
FIG. 22 is a diagram describing a predicted path for processing the data of the $i^{th}$ water ring by using an alternate scanning, when a predictive method is used to process the neighboring data.

FIG. 22 is a diagram describing a predicted path for processing the data of the $i^{th}$ water ring by using an alternate scanning, when a predictive method is used to process the neighboring image data. As shown in the drawing, it is possible to perform predictive encoding from the neighboring image data in almost all cases. However, in case where the data in the B-line are processed after the data in the C-line are processed, one divergence occurs. Therefore, when the data located on the top of the B-line data are processed, the data used for prediction is not the last data of the C-line, but the initial (the very left) data of the A-line.

Rectangular (Elliptic) Water Ring Location Determining Unit

A rectangular water ring can be, if necessary, applied to an image whose breadth is longer than vertical length, such as a screen having a screen ratio of 16:9. A rectangular water ring has a longer horizontal length than a vertical length. Accordingly, a left and right symmetrical core line is determined in an arbitrary water ring origin point, and then the data in the core line is processed with priority.

Figure 23:
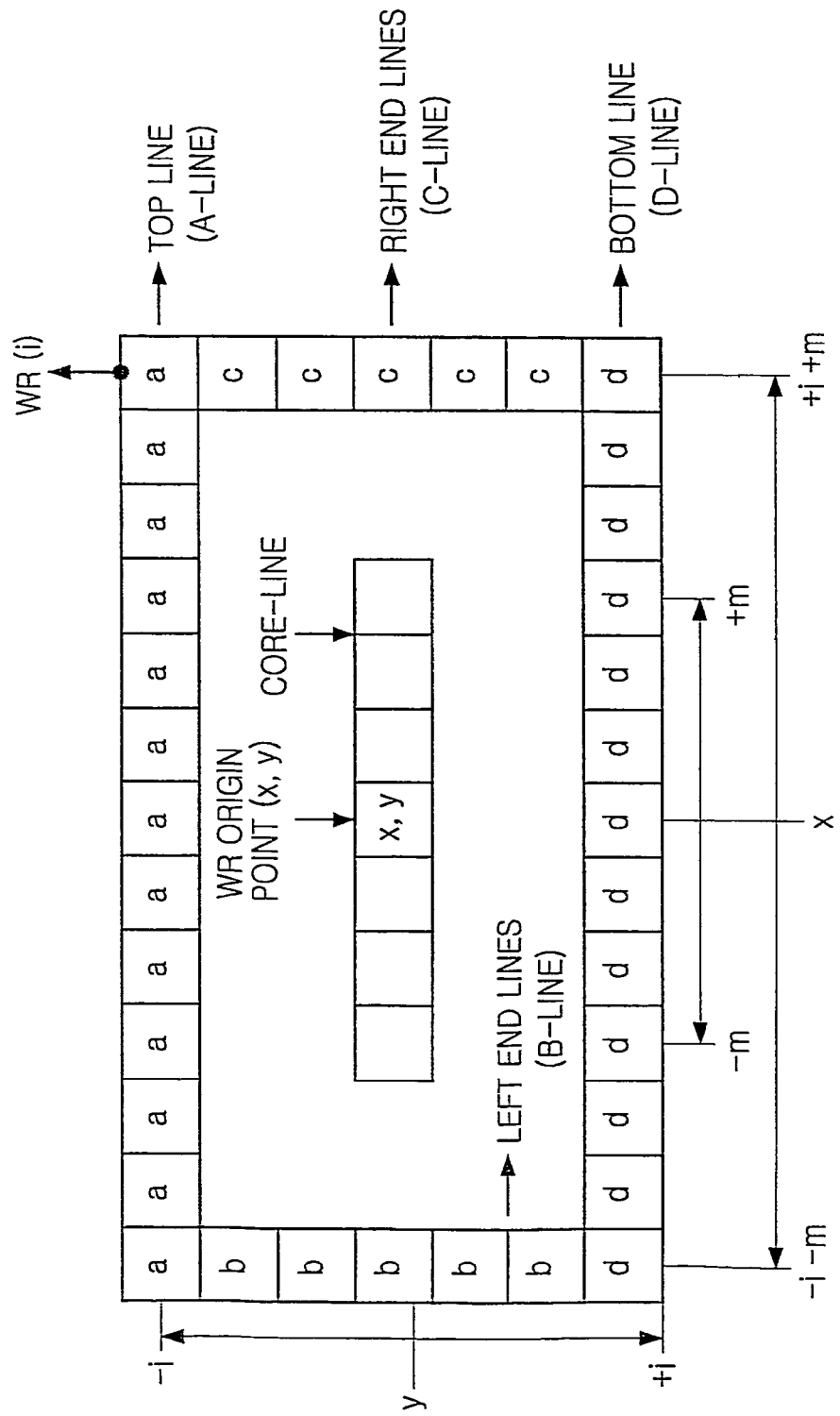
FIG. 23 is a diagram showing the core line and origin point of the $i^{th}$ rectangular water ring.

FIG. 23 is a diagram showing the core line and the origin point of the $i^{th}$ rectangular water ring. The origin point of a rectangular water ring is determined as follows.

Step 1: Determination of Water Ring Origin Point (Water Ring (0))

A water ring origin point, which is marked as Water ring origin point (x,y) in the drawing, is determined. Here, the central part of an image frame may be determined as a water ring origin point, or a user may determine the water ring origin point by himself, arbitrarily.

Step 2: Determination of Core Line Parameters

A rectangular water ring has a longer breadth than a vertical length. Therefore, the length of the left and right symmetrical core line at an arbitrary water ring origin point needs to be determined. In order to determine the length of the core line, parameters (m) that affect the core line length should be determined.

Step 3: Determination of Core Line Location

When the water ring origin point and the core line parameters are determined, the core line can be determined. The determined core line is all the data from (x−m) to (x+m) on the x axis, the y axis being fixed at the water ring origin point (x,y). The x and y axes are based on pixels, blocks, or macro blocks.

Step 4: Determination of Water Ring (i) Location

The location of a water ring (i) generated in the ±(i+m) row on the x axis and ±(i+m)column on the y axis from the water ring origin point. The x and y axes are based on pixels, blocks, or macro blocks.

Step 5: Repetition of Step 4 Until all Data are Processed

The step 4 is repeated until all the data in the image frame that needs to be transmitted are processed.

In FIG. 23, the water ring of the core line is composed of the core line, and the rectangular water ring (i) is composed of the pixels, blocks or macro blocks located in the A-line (top line), B-line (left end line), C-line (right end line), and D-line (bottom line). The rectangular water ring (i) denotes a water ring that is generated in the $i^{th}$ from the water ring origin point (water ring (0)).

The core line in the drawing includes the pixels, blocks, or macro blocks in the locations that are equal to or smaller than ±m from the water ring origin point on the x axis, the y axis being fixed at the water ring origin point. When the water ring origin point is (x,y), the core line is expressed as follows.

Core line: all data located in y and (x−m≦x≦x+m)

In the drawing, the top line (A-line) includes all the pixel, block, or macro block-based image data that are apart as many units as −i from the water ring origin point on the y axis and equal to or smaller than ±(i+m) on the x axis. When the water ring origin point is (x,y), the A-line is expressed as follows.

A-Line: all data located in y−i and (x−(i+m)≦x≦x+(i+m)).

In the drawing, the left end line (B-line) includes all the pixel, block, or macro block-based image data that are apart as many units as −(i+m) from the water ring origin point on the X axis and smaller than ±i on the y axis. When the water ring origin point is (x,y), the B-line is expressed as follows.

B-Line: all data located in x−(i+m) and (y−i<y<y+i).

In the drawing, the location defined as right end line (C-line) includes all the pixel, block, or macro block-based image data that are apart as many units as +(i+m) from the water ring origin point on the x axis and smaller than ±i on the y axis. When the water ring origin point is (x,y), the C-line is expressed as follows.

C-Line: all data located in x+(i+m) and (y−i<y<y+i).

In the drawing, the location defined as bottom line. (D-line) includes all the pixel, block, or macro block-based image data that are apart as many units as +i from the water ring origin point on the y axis and equal to or smaller than ±(i+m) on the x axis. When the water ring origin point is (x,y), the D-line is expressed as follows.

D-Line: all data located in y+i and (x−(i+m)≦x≦x+(i+m)).

To generate a rectangular water ring, a method and apparatus for processing the water ring of a core line may be added to the method and apparatus for processing a quadrate water ring.

Figure 24A:
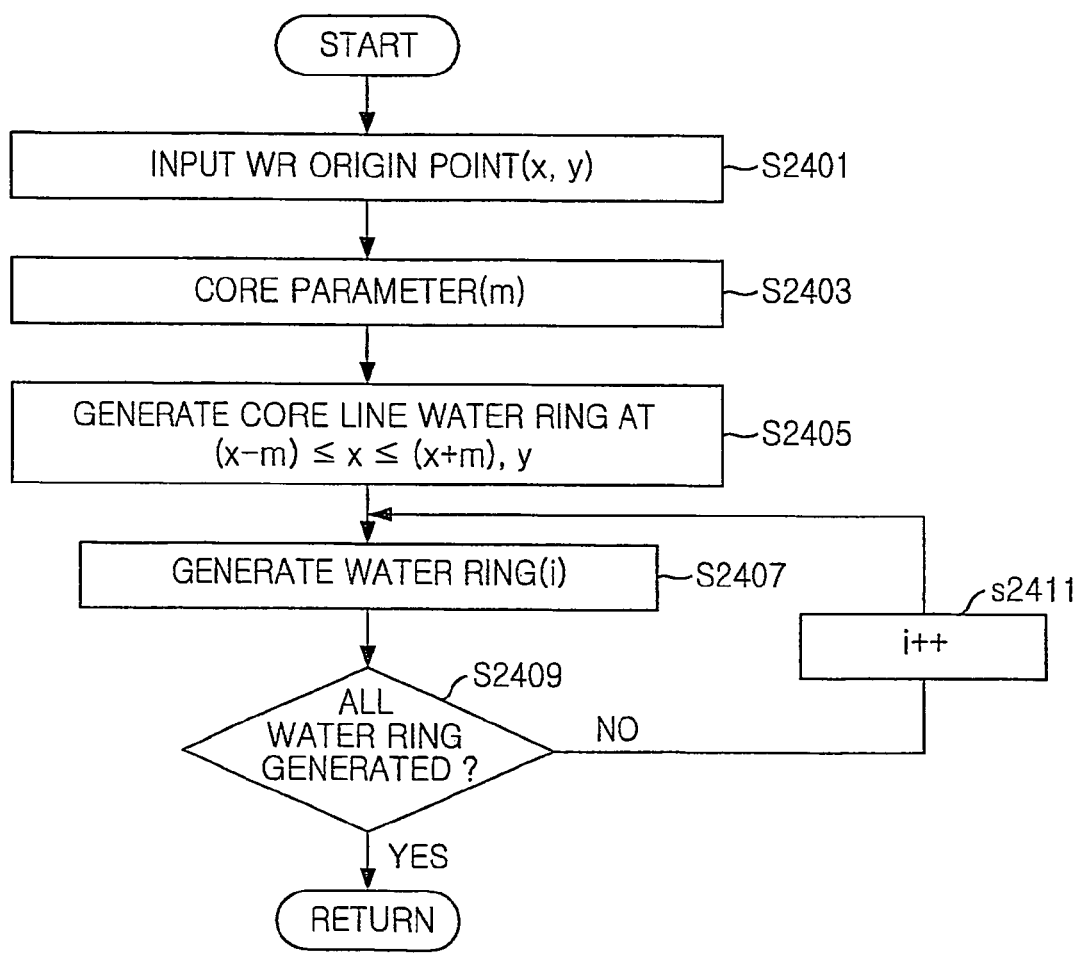
FIG. 24A is a flow chart describing the process of generating rectangular water rings in accordance with an embodiment of the present invention.
Figure 24B:
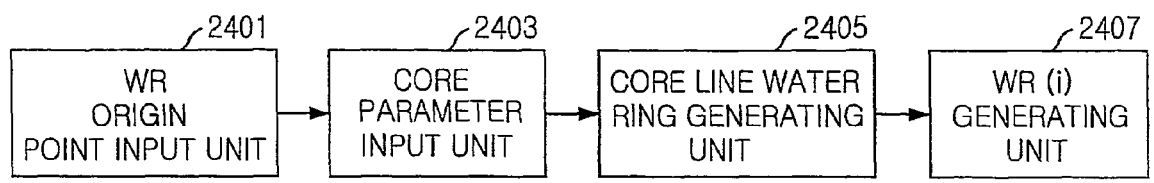
FIG. 24B is a structural diagram showing a rectangular water ring generating apparatus in accordance with an embodiment of the present invention.

FIG. 24A is a flow chart describing the process of generating rectangular water rings in accordance with an embodiment of the present invention, and FIG. 24B is a structural diagram showing an apparatus for generating a rectangular water ring in accordance with an embodiment of the present invention. That is, when an arbitrary water ring origin point is determined at step S2401 in a water ring origin point input unit 2401, and the core parameters are determined, or inputted, at step S2403 in a core parameter input unit 2403, a core line water ring generating unit 2405 generates a water ring using the core parameters and processes the data at step S2405. Then, a water ring(i) generating unit 2407 generates the $i^{th}$ water ring so as to process the data in the corresponding location at step S2407. At steps S2409 and S2411, this process is repeated, until water rings are generated to cover the entire image and process the data in the corresponding water ring locations.

Just as the quadrate water ring processing method, in the rectangular water ring processing method, too, the data in a water ring (i) can be processed in various methods. Among the methods are raster scanning and alternate scanning.

In raster scanning, the data in the water ring (i) are processed in order from the top left to the bottom right. The scanning is performed from the data in the core line, and then, performed on the A-line, B-line/C-line, and D-line of each water ring. Here, when the data in the B-line and the C-line are processed, the data of the B-line and the data of the C-line are scanned alternately from left to right, and if one line is scanned up, the next line under the line is scanned, and this process is repeated until all the data in the middle lines are scanned. This method has an advantage that it can be used easily. The alternate scanning method for processing the data of a water ring (i) is introduced to use the predictive encoding method easily.

Figure 25:
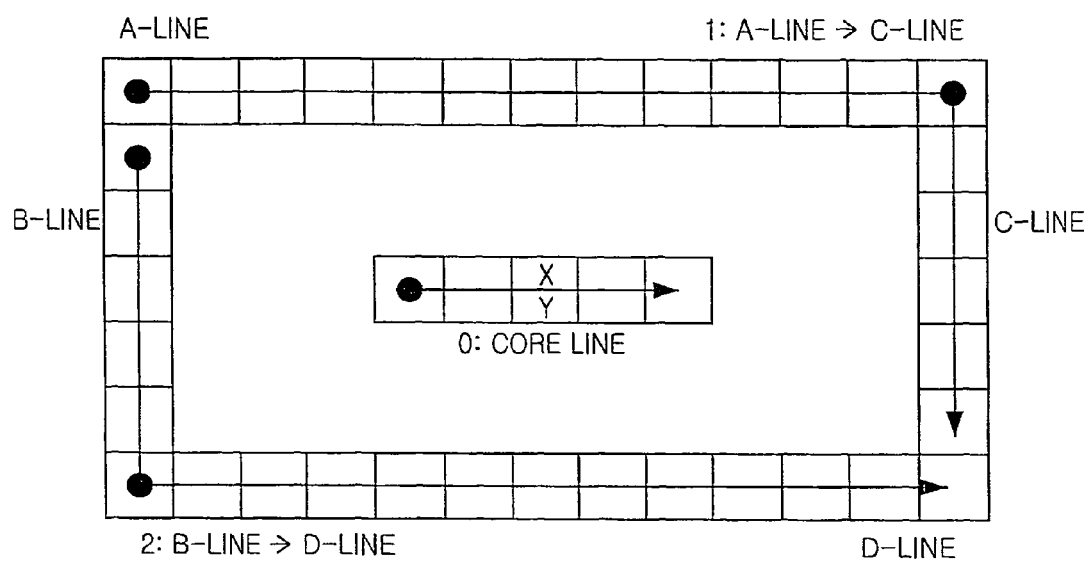
FIG. 25 is a diagram describing a method of processing the in the core line and the data of the $i^{th}$ water ring in rectangular water rings by using the alternate scanning.

FIG. 25 is a diagram describing a method of processing the data in the core line and the data of the $i^{th}$ water ring in rectangular water rings by using the alternate scanning. As illustrated in FIG. 25, the data of the core line at the water ring origin point are processed with priority, and then when a water ring (i) is generated, the data of its A-line are processed from left to right, and the data of its C-line are processed from up to down. Subsequently, the data of the B-line are processed from up to down, and finally, the data of the D-line are processed. This data processing method is referred to as an alternate scanning. That is, the data of the core line are processed first, and then when the data of a water ring(i) are processed, the data are processed in the order of A-line, C-line, B-line, and D-line.

Figure 26:
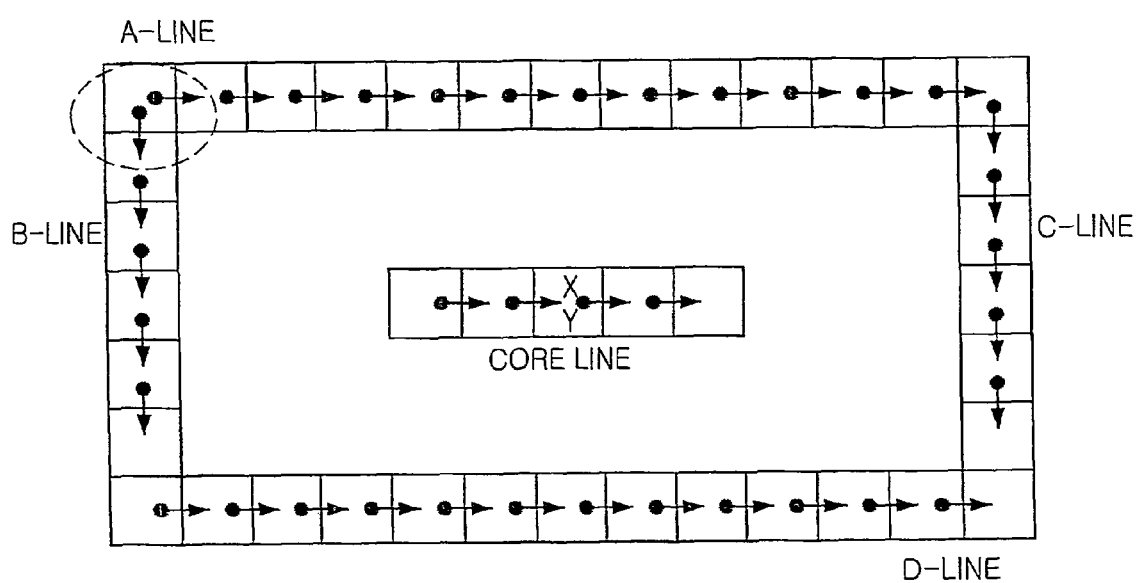
FIG. 26 is a diagram illustrating a predicted path for processing the data in the core line and the data of the $i^{th}$ water ring in rectangular water rings by using the alternate scanning.

FIG. 26 is a diagram illustrating a predicted path for processing the data in the core line and the data of the $i^{th}$ water ring in rectangular water rings by using the alternate scanning. In case of using the alternate scanning, the predictive encoding can be performed from the neighboring data in almost all cases. However, after the data of the C-line is processed and then those of the B-line are processed, one divergence occurs. Here, when the data at the top of the B-line is processed, prediction is carried out not by using the last data of the C-line, but by using the very left data of the A-line.

Data Processing Unit

Encoding and transmission of image data are performed based on the location of a water ring to be scanned, which is determined in the water ring location determining unit, and the weight of the significance in an image, which is determined in the image QF determining unit.

The method and apparatus for performing the process can be divided into two types. One is a method shown in FIG. 6 where the encoding and transmission of an image (in case of an encoder, encoding and transmission, and in case of a decoder, transmission and decoding) are synchronized with the water ring origin point, and the other one is a method shown in FIGS. 7 and 8 where the image encoding/decoding) and the bit stream transmission/reception) are processed separately, if the data encoding is performed using raster scan order. These methods are different in the order of performing data processing, but not different in the operation of each unit.

As described above, the data processing unit follows the encoding method for improving image quality suitably for the human visual system by applying the QF value determined in the water ring QF determining unit to each water ring (i). It performs data transmission from the encoder to the decoder in the order of each water ring location, which is determined in the water ring location determining unit.

One example of using the QF value determined in the water ring QF determining unit is encoding data based on each bit-plane. Besides, there are many methods of using QF, and in the present invention, it is suggested as follows.

Application of QF Based on Bit-Plane

There are many methods for performing image encoding based on a bit-plane. One method is a fine granular scalability (FGS) encoding method in MPEG. The FGS encoding method divides image data to be transmitted from a transmitting end to a receiving end into bit-planes, and transmits the most significant bit (MSB) of the bit-planes on a top priority. Then, it divides the next most significant bit into bit planes and transmits the bit planes in succession to the MSB.

For example, it is assumed that an image data of 25 needs to be transmitted. 25 is expressed as 11001 in binary scale, and 11001 is composed of five bit planes. To transmit the data based on a bit plane, it should be notified that all data transmitted from the encoder to the decoder are composed of five bit planes. When the data is transmitted to the receiving end on a bit basis from the MSB to the least significant bit (LSM), and the first MSB bit is transmitted, the receiving end comes to know that the data to be transmitted is more than 16 (10000). Then, when the second bit is transmitted, it can understand that a value more than 24 (11000) is transmitted.

In this invention, a method that uses a QF value as a shift factor is suggested to apply a QF value to the bit-plane-based encoding method. By applying a QF value to each water ring (i) as a shift factor and thereby moving the corresponding data value to the left as many units as the shift factor, more bit planes can be transmitted to the receiving end with priority.

By encoding the received bit planes precisely, image quality can be improved. Subsequently, the decoder receives the QF value corresponding to the data that needs to be decoded, and uses the QF value as a shift factor. Then, the bit stream of the corresponding data is moved to the right, and thereby the data are restored more precisely.

For example, it is assumed that there is a data 55. 55 is composed of eight bit planes, and it is expressed as 00110111 in the binary scale. Generally, when this data is transmitted, the first bit plane carries 0, and the second and the third bit plane carry 0 and 1, respectively. IF the QF value is 2, two bits become shifted to the left to create a bit stream of 11011100, and when the data is transmitted from the encoder to the decoder, the first bit plane carries 1, and the second and third bit planes become to carry 1 and 0, respectively. The decoder receives the QF value 2, first, and the three bit planes 110. Then, the bit planes are shifted two bits to the right with the help of the QF value, and restored into 00110000. This is the result of restoring the original data into 48. IF the QF value is not used and the three bit planes are received as they are, the received bit planes are 001. Then, the restored value becomes 00100000, which is 32. In short, if the QF value is applied to the same data, it becomes possible to decode bit planes into a value closer to the original data, which leads to the improvement of image quality.

In case where a QF value is determined in each water ring (i) and used for bit-plane-based image data encoding, the QF value is used as a shift factor. Then, for the water rings having a large QF value, more data are transmitted and restored, while less data are transmitted for the water rings having a small QF value. Consequently, the data in the water ring having a large QF value are restored more precisely, thus bringing about the result of making the image quality improved suitably for the human visual system.

Illustrated in Table 1 is an example of a decoder that restores image data with the first three bit planes among seven bit planes, when the QF value is given as 2 and when no QF value given. From Table 1, it can be seen that when a QF value is given, the data is restored more precisely than those not having any QF value. This shows that the image quality restored by using a QF value is more excellent.

TABLE 1

Data Restoration Result in Decoder Using Bit-plane-based QF value

| Coder | | | | Decoder | | |
|---|---|---|---|---|---|---|
| Actual Data | QF Value | Bit Stream | Shifted Bit Stream | Received Bit Stream(First Three Bits) | Restored Bit Stream | Restored Data |
| 22 | 2 | 0010110 | 1011000 | 101 | 0010100 | 20 |
|    | 0 |         | 0010110 | 001 | 0010000 | 16 |
| 12 | 2 | 0001100 | 0110000 | 011 | 0001100 | 12 |
|    | 0 |         | 0001100 | 000 | 0000000 | 0  |

Example of Applying Intelligent Water Ring Scanning to Moving Image Encoding Method An example of applying the intelligent water ring scanning, which is suggested in the present invention, to actual moving image encoding method is described herein. When a discrete cosine transform (DCT) encoding method is used, image data are encoding by generating a water ring on a 4×4 or 8×8 block basis, or on a 16×16 macro block basis. In case of a pixel-based image encoding method using wavelet transform, image data are encoded by generating a water ring on a pixel basis.

As an example of applying the water ring scan order to the moving image process that uses DCT, when the water ring scan order is applied to a QCIF (176×144 pixels) image frame, there are 16×16 numbers of 11×9 macro blocks. In an embodiment, if image data are encoded by generating a water ring on a macro block basis from a macro block in the center of the image frame, a total of six water rings, a water ring (1), ..., a water ring (5), are generated from the water ring origin point (water ring (0)), and the image frame is encoded using the QF values of the water rings, so as to improve the image quality suitably for the human visual system. In case where some data are not received due to poor transmission environment, the macro block-based data in the center of the image frame, such as water ring (0) and water ring (1), are transmitted on a top priority, and they have a high possibility that they can be received at the receiving end and decoded. Therefore, although the macro block-based data on the outskirt of the image are not processed, the image quality at the center is always secured as good as possible. An example of applying the intelligent water ring scanning to a FGS encoding method is shown below.

Figure 27:
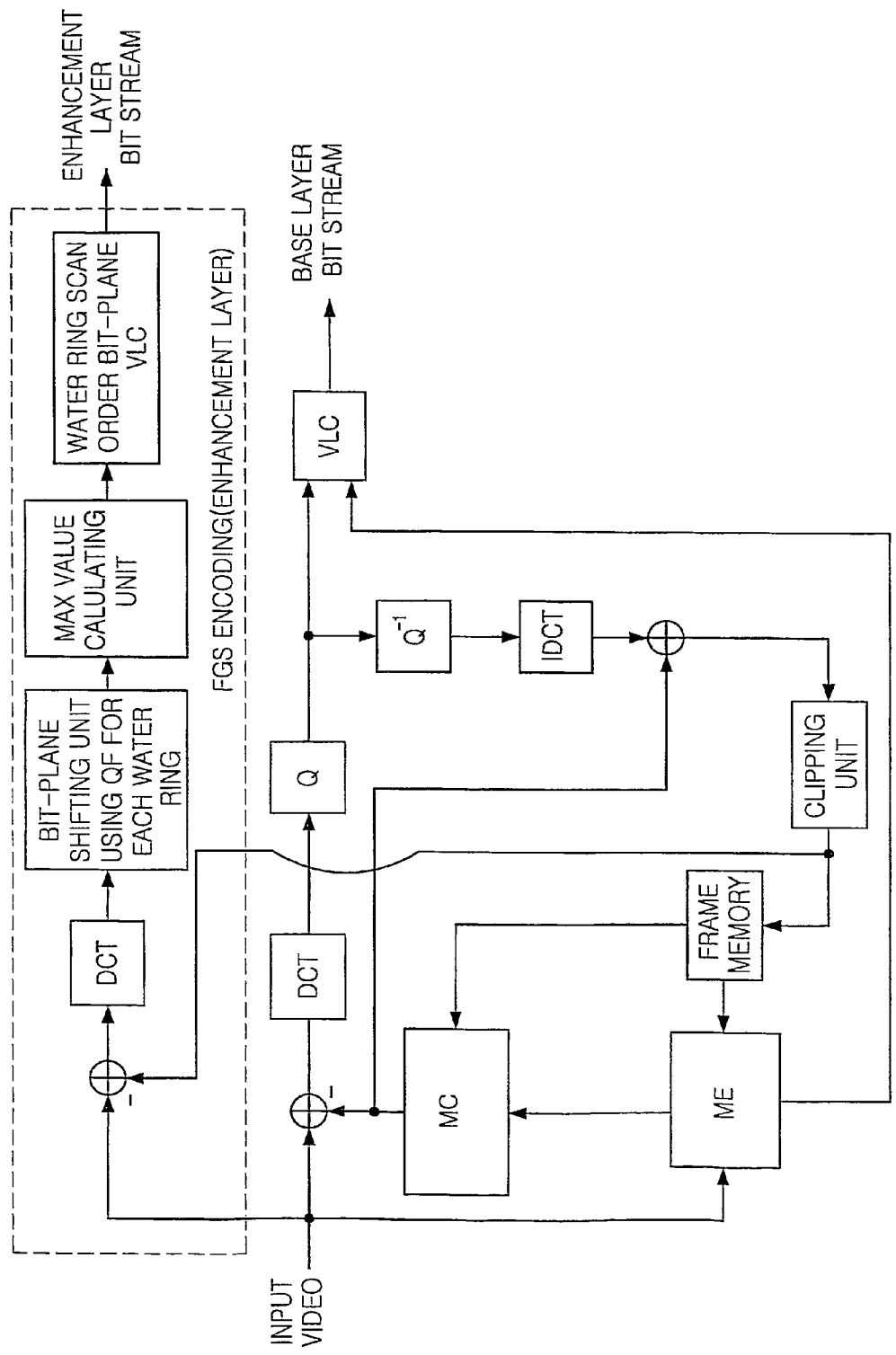
FIG. 27 is a structural diagram showing an encoder, where the intelligent water ring scanning is applied to the FGS encoding method in accordance with an embodiment of the present invention.
Figure 28:
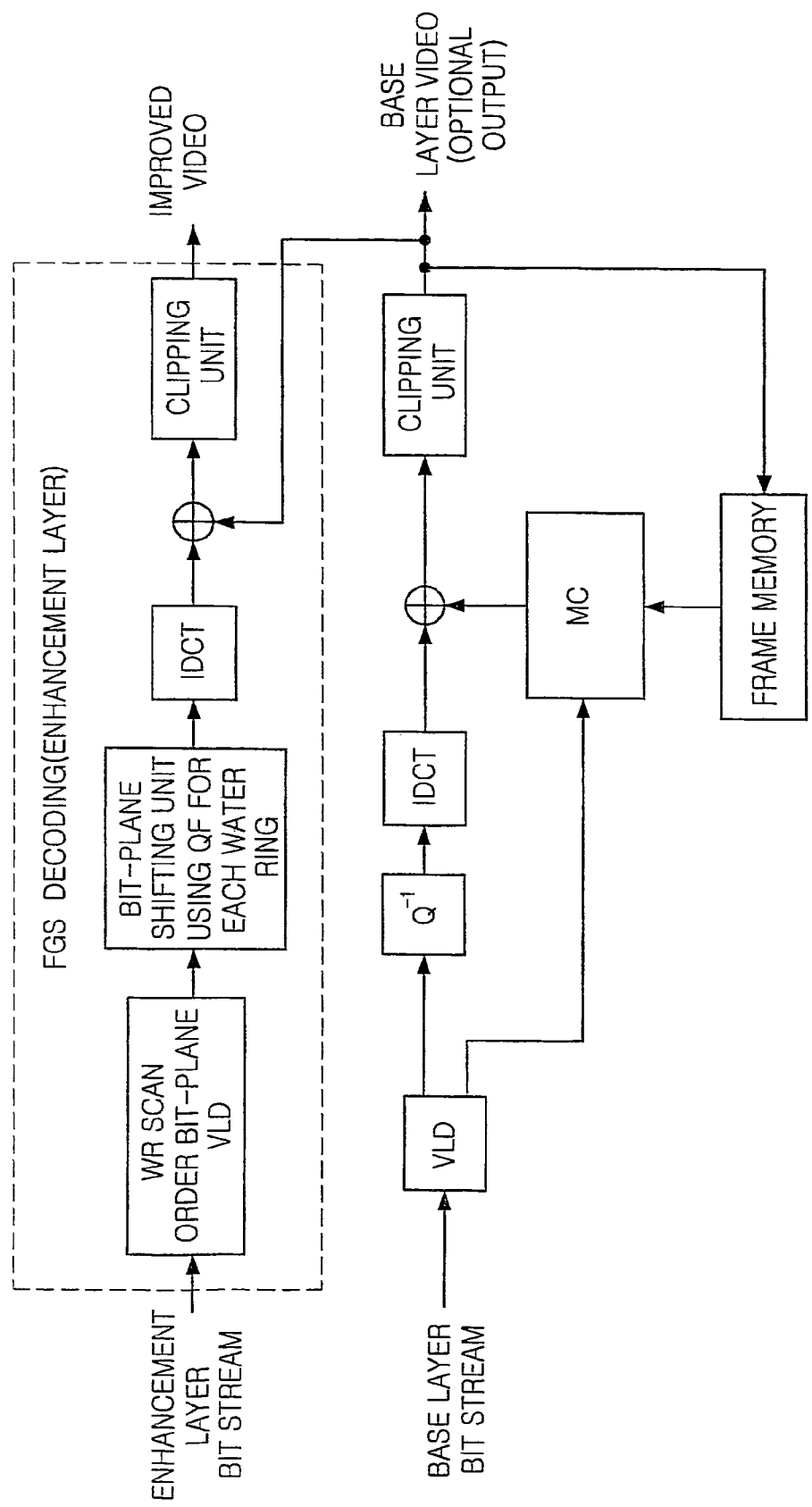
FIG. 28 is a structural diagram showing a decoder, where the intelligent water ring scanning is applied to the FGS decoding method in accordance with an embodiment of the present invention.

FIG. 27 is a structural diagram showing an encoder, where the intelligent water ring scanning is applied to the FGS encoding method in accordance with an embodiment of the present invention, and FIG. 28 is a structural diagram showing a decoder, where the intelligent water ring scanning is applied to the FGS decoding method in accordance with an embodiment of the present invention.

As illustrated in FIG. 27, the encoding in the FGS enhancement layer is performed through a residue calculating unit for obtaining the residue between the original image and the image restored in the base layer, a discrete cosine transform (DCT) unit, a bit-plane shifting unit using QF for each water ring, a maximum value calculating unit, and a water ring scan order bit-plane VLC unit.

In the residue calculating unit, the difference between the original image and the image, which is encoded and restored in the base layer (that is, an image restored after passing through an inverse quantizing unit ($Q^{-1}$) and an inverse DCT unit (IDCT) and then being clipped), is obtained. Here, the difference becomes the residue.

The DCT transforms the image-based residue obtained in the above residue calculating process into a DCT domain, using block(8×8)-based DCT. The bit-plane shifting unit using QF for each water ring performs bit-plane shift by using QF for each water ring so as to improve image quality suitably for the human visual system.

In the maximum value calculating unit, the maximum value of the absolute values of all the numbers, which has gone through discrete cosine transform, is obtained. The obtained maximum value is used to obtain the total number of the maximum bit-planes for transmitting the corresponding image frame.

The water ring scan order bit-plane VLC determines the location of a macro block or a block to be scanned on a top priority by performing the water ring scanning from a certain location that is determined arbitrarily, when bit-plane VLC is performed based on each bit-plane. Then, it forms a matrix in a zigzag scanning from the block-based 64 DCT coefficients of each bit-plane in accordance with the determined encoding order, i.e., the priority order, and each of the matrix performs run-length encoding based on a VLC table. Since the other encoding process in the base layer is already described in the background of the prior art, it is not described herein any more.

Meanwhile, as shown in FIG. 28, the FGS enhancement layer decoding suggested in the present invention is performed on the bit stream transmitted to the enhancement layer in reverse to the encoding. With respect to the enhancement bit stream inputted earlier, the water ring scan order bit-plane VLD unit performs bit-plane VLD from the water ring origin point in the water ring scan order.

Subsequently, the bit-plane shifting unit using a QF value for each water ring performs bit-plane shift by using the QF value for each water ring, when the QF value of each water ring is transmitted to make the image quality suitable for human visual system. The IDCT unit performs block(8×8)-based inverse discrete cosine transform (IDCT) on a value obtained after the bit-plane VLD process and the bit-plane shifting process using a QF value for each water ring, and after the transmitted image is restored in the enhancement layer, the clipping unit clips the image restored in the base layer and the summed values into a value between 0 and 255 so as to restore the image with improved quality.

As described above, the method of the present invention can be embodied as a program and recorded in a computer-readable recording medium, such as CD-Rom, RAM, ROM, floppy disk, hard disk, optical magnetic disk and the like. The apparatus of the present invention having a structure described above can guarantee a quality image in a particular image part having significance even in a poor transmission environment, where not all the bit stream are transmitted from the encoder to the decoder successively, by improving the significant part suitably for the human visual system, and then encoding, transmitting and decoding at the receiving end the data of the significant part with priority.

While the present invention has been described with respect to certain preferred embodiments, it will be apparent to those skilled in the art that various changes and modifications may be made without departing from the scope of the invention as defined in the following claims.

What is claimed is:

1. A concentric water ring scan apparatus applied to an image encoding/decoding system, comprising:
    a concentric water ring origin point determining means for determining a concentric water ring origin point, a concentric water ring (0), in an image frame;
    a concentric water ring location determining means for determining the location of the $i^{th}$ concentric water ring, a concentric water ring (i) that surrounds the concentric water ring origin point, i being an integer between 1 and N where N is at least 2; and
    a concentric water ring quality factor (OF) determining means for determining OF values of the concentric water ring origin point and the concentric water ring based on significance of the concentric water ring origin point and the concentric water ring, wherein the OF values decrease as a function of the distance of each concentric water ring (i) from the concentric water ring origin point.

2. The concentric water ring scan apparatus as recited in claim 1, wherein the concentric water ring origin point is predetermined and stored in the image encoding/decoding system.

3. The concentric water ring scan apparatus as recited in claim 1, wherein the concentric water ring origin point is determined with respect to all the image frames that constitutes an image sequence in the image encoding system and transmitted to the image decoding system.

4. The concentric water ring scan apparatus as recited in claim 1, wherein the concentric water ring origin point is determined with respect to each image frame in the image encoding system and transmitted to the image decoding system.

5. The concentric water ring scan apparatus as recited in claim 4, wherein the concentric water ring origin point is expressed as absolute coordinates in the image frame.

6. The concentric water ring scan apparatus as recited in claim 4, wherein the concentric water ring origin point is expressed as relative coordinates from the central point of the image frame.

7. The concentric water ring scan apparatus as recited in claim 4, wherein the concentric water ring origin point is expressed as relative coordinates from the concentric water ring origin point of the preceding image frame previously transmitted from the image encoding system to the image decoding system.

8. The concentric water ring scan apparatus as recited in claim 1, wherein the OF values corresponding to the concentric water ring origin point and each of the concentric water rings are predetermined and arranged in a table, and the table is stored in the image encoding/decoding system.

9. The concentric water ring scan apparatus as recited in claim 1, wherein the OF values for the concentric water ring origin point and each of the concentric water rings of all the image frames that constitute an image sequence are determined in the image encoding system and transmitted to the image decoding system.

10. The concentric water ring scan apparatus as recited in claim 1, wherein the OF values for the concentric water ring origin point and each of the concentric water rings of the image frame are determined in the image encoding system and transmitted to the image decoding system.

11. The concentric water ring scan apparatus as recited in claim 1, wherein the OF value includes:
the maximum number of concentric water rings having the OF value in the image frame;
the maximum OF value; and
a OF compensation value for each concentric water ring having the OF value, which is obtained by subtracting the OF value of the current concentric water ring from the OF value of the preceding concentric water ring, and Wherein the OF value is encoded by flexible length encoding and transmitted from the image encoding system.

12. The water ring scan apparatus as recited in claim 1, wherein the OF value is determined based on a maximum OF value and a OF variance which is a variance value of the OF values and predetermined and stored in the image encoding/decoding system.

13. The concentric water ring scan apparatus as recited in claim 1, wherein the OF values of the concentric water rings of all the image frames that constitute an image sequence are determined based on the maximum OF value and a OF variance which is a variance value of the OF values, wherein the maximum OF value and the OF variance are determined in the encoding and transmitted to the decoding system.

14. The concentric water ring scan apparatus as recited in claim 1, wherein the OF values of the concentric water rings of an image frame are determined based on the maximum OF value and a OF variance, which is a variance value of the OF values, wherein the maximum OF value and the OF variance are determined in the encoding and transmitted to the decoding system.

15. A computer readable recording medium having recorded thereon a computer program which when executed by a computer performs a concentric water ring scan method applied to an image encoding/decoding system, comprising the steps of:
a) determining a concentric water ring origin point, a concentric water ring (0), in an image frame;
b) determining the location of the $i^{th}$ concentric water ring, a concentric water ring (i) that surrounds the concentric water ring origin point, i being an integer between 1 and N where N is at least 2; and
c) determining OF values of the concentric water ring origin point and the concentric water ring based on significance of the concentric water ring origin point and the concentric water ring, wherein the OF values decrease as a function of the distance of each concentric water ring (i) from the concentric water ring origin point.

16. The concentric water ring scan method as recited in claim 15, wherein the concentric water ring origin point is predetermined and stored in the image encoding/decoding system.

17. The concentric water ring scan method as recited in claim 15, wherein the concentric water ring origin point is determined with respect to all the image frames that constitutes an image sequence in the image encoding system and transmitted to the image decoding system.

18. The concentric water ring scan method as recited in claim 15, wherein the concentric water ring origin point is determined with respect to each image frame in the image encoding system and transmitted to the image decoding system.

19. The concentric water ring scan method as recited in claim 18, wherein the concentric water ring origin point is expressed as absolute coordinates in the image frame.

20. The concentric water ring scan method as recited in claim 18, wherein the concentric water ring origin point is expressed as relative coordinates from the central point of the image frame.

21. The concentric water ring scan method as recited in claim 18, wherein the concentric water ring origin point is expressed as relative coordinates from the concentric water ring origin point of the preceding image frame previously transmitted from the image encoding system to the image decoding system.

22. The concentric water ring scan method as recited in claim 15, wherein the OF values corresponding to the concentric water ring origin point and each of the concentric water rings are predetermined and arranged in a table, and the table is stored in the image encoding/decoding system.

23. The concentric water ring scan method as recited in claim 15, wherein the OF values for the concentric water ring origin point and each of the concentric water rings of all the image frames that constitute an image sequence are determined in the image encoding system and transmitted to the image decoding system.

24. The concentric water ring scan method as recited in claim 15, wherein the OF values for the concentric water ring origin point and each of the concentric water rings of the image frame are determined in the image encoding system and transmitted to the image decoding system.

25. The concentric water ring scan method as recited in claim 15, wherein the OF value includes:
the maximum number of concentric water rings having the OF value in the image frame;
the maximum OF value; and
a OF compensation value for each concentric water ring having the OF value, which is obtained by subtracting the OF value of the current concentric water ring from the OF value of the preceding concentric water ring, and Wherein the OF value is encoded by flexible length encoding and transmitted from the image encoding system.

26. The water ring scan method as recited in claim 15, wherein the OF value is determined based on a maximum OF value and a OF variance which is a variance value of the OF values and predetermined and stored in the image encoding/decoding system.

27. The concentric water ring scan method as recited in claim 15, wherein the OF values of the concentric water rings of all the image frames that constitute an image sequence are determined based on the maximum OF value and a OF variance which is a variance value of the OF values, wherein the maximum OF value and the OF variance are determined in the encoding and transmitted to the decoding system.

28. The concentric water ring scan method as recited in claim 15, wherein the OF values of the concentric water rings of an image frame are determined based on the maximum OF value and a OF variance, which is a variance value of the OF values, wherein the maximum OF value and the OF variance are determined in the encoding and transmitted to the decoding system.

* * * * *